(12) United States Patent
Fujisaki et al.

(10) Patent No.: US 10,467,184 B2
(45) Date of Patent: Nov. 5, 2019

(54) PARALLEL PROCESSING APPARATUS, PARALLEL COMPUTING METHOD, AND RECORDING MEDIUM STORING PARALLEL COMPUTING PROGRAM

(71) Applicant: FUJITSU LIMITED, Kawasaki-shi, Kanagawa (JP)

(72) Inventors: Jun Fujisaki, Kawasaki (JP); Ryoji Tandokoro, Fujisawa (JP); Akira Hosoi, Atsugi (JP); Hideyuki Shitara, Toda (JP)

(73) Assignee: FUJITSU LIMITED, Kawasaki (JP)

( * ) Notice: Subject to any disclaimer, the term of this patent is extended or adjusted under 35 U.S.C. 154(b) by 30 days.

(21) Appl. No.: 15/994,451

(22) Filed: May 31, 2018

(65) Prior Publication Data
US 2018/0349316 A1   Dec. 6, 2018

(30) Foreign Application Priority Data

Jun. 5, 2017  (JP) ................................ 2017-110981

(51) Int. Cl.
*G06F 15/80* (2006.01)
*G06F 15/82* (2006.01)
*G06F 17/12* (2006.01)

(52) U.S. Cl.
CPC ............ *G06F 15/803* (2013.01); *G06F 15/82* (2013.01); *G06F 17/12* (2013.01)

(58) Field of Classification Search
CPC ......... G06F 15/803; G06F 15/82; G06F 17/12
(Continued)

(56) References Cited

U.S. PATENT DOCUMENTS 7,516,056 B2 *  4/2009  Wallis ................. G06F 17/5018
703/10

FOREIGN PATENT DOCUMENTS

JP        7-28760          1/1995

OTHER PUBLICATIONS

K. Stüben, "Algebraic Multigrid (AMG): An Introduction with Applications", GMD-Report 70, pp. 1-127, Nov. 10, 1999, [online], <https://www.scai.fraunhofer.de/content/dan/scai/de/documents/AllgemeineDokumentensammlung/Schnelleoester/SAMG/AMG_Introduction.pdf> (127 pages).
(Continued)

*Primary Examiner* — Tan V Mai
(74) *Attorney, Agent, or Firm* — Fujitsu Patent Center

(57) ABSTRACT

A parallel processing apparatus includes: processors; and a network switch, wherein a first processor: generates divided matrix data by dividing the matrix data in such a manner that an overlapping portion is present with each other; transmits the divided matrix data to a second processor; generates first evaluation-value matrix data from the divided matrix data; transmits, to the second processor, first elements in a first overlapping portion of the first evaluation-value matrix data; receives, from the second processor, second elements of a second overlapping portion of second evaluation-value matrix data; calculates first added evaluation data by adding the second elements to the first elements; transmits the first added evaluation data to the second processor; receives, from the second processor, second added evaluation data; and calculates a first C point or a first F point based on the first evaluation-value matrix data which is updated using the second added evaluation data.

9 Claims, 28 Drawing Sheets

(58) Field of Classification Search
USPC .......................................................... 708/446
See application file for complete search history.

(56) References Cited

OTHER PUBLICATIONS

David M. Alber et al. "Parallel coarse-grid selection", Numerical Linear Algebra With Applications, Numer. Linear Algebra Appl. 2007; 14:611-643, Published online Jul. 25, 2007 in Wiley InterScience (33 pages).

* cited by examiner $Ax^0 = b$ : EQUATION TO BE SOLVED FINALLY
(TO BE PREPROCESSED)

$r^0, r^1, r^2$ : RESIDUAL $P_0^1, P_1^0, P_2^1, P_1^2, P_3^2, P_2^3$ : INTERPOLATION MATRIX

FIG. 12

PROCESS 0

|  | | LOCAL NUMBER → | 0 | 1 | 2 | 6 | 7 | 8 | 3 | 9 | ← GLOBAL NUMBER |
|---|---|---|---|---|---|---|---|---|---|---|---|
| GLOBAL NUMBER → | | | 0 | 1 | 2 | 3 | 4 | 5 | 6 | 7 | ← LOCAL NUMBER |
| 0 | 0 | | 4 | -1 | 0 | -1 | 0 | 0 | 0 | 0 | |
| 1 | 1 | | -1 | 6 | -1 | 0 | -1 | 0 | 0 | 0 | |
| 2 | 2 | | 0 | -1 | 6 | 0 | 0 | -1 | -1 | 0 | |
| 6 | 3 | | -1 | 0 | 0 | 4 | -1 | 0 | 0 | 0 | |
| 7 | 4 | | 0 | -1 | 0 | -1 | 6 | -1 | 0 | 0 | |
| 8 | 5 | | 0 | 0 | -1 | 0 | -1 | 6 | 0 | -1 | |

PROCESS 1

|  |  | 3 | 4 | 5 | 9 | 10 | 11 | 2 | 8 |
|---|---|---|---|---|---|---|---|---|---|
|  |  | 0 | 1 | 2 | 3 | 4 | 5 | 6 | 7 |
| 3 | 0 | 6 | -1 | 0 | -1 | 0 | 0 | -1 | 0 |
| 4 | 1 | -1 | 6 | -1 | 0 | -1 | 0 | 0 | 0 |
| 5 | 2 | 0 | -1 | 4 | 0 | 0 | -1 | 0 | 0 |
| 9 | 3 | -1 | 0 | 0 | 6 | -1 | 0 | 0 | -1 |
| 10 | 4 | 0 | -1 | 0 | -1 | 6 | -1 | 0 | 0 |
| 11 | 5 | 0 | 0 | -1 | 0 | -1 | 4 | 0 | 0 |

FIG. 13

PROCESS 0

| GLOBAL NUMBER | LOCAL NUMBER | EVALUATION VALUE λ |
|---|---|---|
| 0 | 0 | 2 |
| 1 | 1 | 3 |
| 2 | 2 | 2 |
| 6 | 3 | 2 |
| 7 | 4 | 3 |
| 8 | 5 | 2 |
| 3 | 6 | 1 |
| 9 | 7 | 1 |

PROCESS 1

| GLOBAL NUMBER | LOCAL NUMBER | EVALUATION VALUE λ |
|---|---|---|
| 3 | 0 | 2 |
| 4 | 1 | 3 |
| 5 | 2 | 2 |
| 9 | 3 | 2 |
| 10 | 4 | 3 |
| 11 | 5 | 2 |
| 2 | 6 | 1 |
| 8 | 7 | 1 |

FIG. 16

| PROCESS 0 | | | |
|---|---|---|---|
| GLOBAL NUMBER | $\lambda$ | $\lambda'$ | $\lambda$ |
| 0 | 2 | | 2 |
| 1 | 3 | | 3 |
| 2 | 2 | 1 | 3 |
| 6 | 2 | | 2 |
| 7 | 3 | | 3 |
| 8 | 2 | 1 | 3 |
| 3 | 1 | | 1 |
| 9 | 1 | | 1 |

| PROCESS 1 | | | |
|---|---|---|---|
| GLOBAL NUMBER | $\lambda$ | $\lambda'$ | $\lambda$ |
| 3 | 2 | 1 | 3 |
| 4 | 3 | | 3 |
| 5 | 2 | | 2 |
| 9 | 2 | 1 | 3 |
| 10 | 3 | | 3 |
| 11 | 2 | | 2 |
| 2 | 1 | | 1 |
| 8 | 1 | | 1 |

FIG. 18

| PROCESS 0 | | | |
|---|---|---|---|
| GLOBAL NUMBER | $\lambda$ | $\lambda''$ | $\lambda$ |
| 0 | 2 | | 2 |
| 1 | 3 | | 3 |
| 2 | 3 | | 3 |
| 6 | 2 | | 2 |
| 7 | 3 | | 3 |
| 8 | 3 | | 3 |
| 3 | 1 | 3 | 3 |
| 9 | 1 | 3 | 3 |

| PROCESS 1 | | | |
|---|---|---|---|
| GLOBAL NUMBER | $\lambda$ | $\lambda''$ | $\lambda$ |
| 3 | 3 | | 3 |
| 4 | 3 | | 3 |
| 5 | 2 | | 2 |
| 9 | 3 | | 3 |
| 10 | 3 | | 3 |
| 11 | 2 | | 2 |
| 2 | 1 | 3 | 3 |
| 8 | 1 | 3 | 3 |

FIG. 19

PROCESS 0

| GLOBAL NUMBER | LOCAL NUMBER | C/F POINT (C/F) |
|---|---|---|
| 0 | 0 | F |
| 1 | 1 | C |
| 2 | 2 | F |
| 6 | 3 | C |
| 7 | 4 | F |
| 8 | 5 | C |
| 3 | 6 | C |
| 9 | 7 | F |

PROCESS 1

| GLOBAL NUMBER | LOCAL NUMBER | C/F POINT (C/F) |
|---|---|---|
| 3 | 0 | C |
| 4 | 1 | F |
| 5 | 2 | C |
| 9 | 3 | F |
| 10 | 4 | C |
| 11 | 5 | F |
| 2 | 6 | F |
| 8 | 7 | C |

FIG. 24

| PROCESS 0 | | | |
|---|---|---|---|
| GLOBAL NUMBER | C/F POINT (C/F) | C/F' | C/F POINT (C/F) |
| 0 | F |  | F |
| 1 | C |  | C |
| 2 | F |  | F |
| 6 | C |  | C |
| 7 | F |  | F |
| 8 | C |  | C |
| 3 | C | C | C |
| 9 | 7 | F | F |

| PROCESS 1 | | | |
|---|---|---|---|
| GLOBAL NUMBER | C/F POINT (C/F) | C/F' | C/F POINT (C/F) |
| 3 | C |  | C |
| 4 | F |  | F |
| 5 | C |  | C |
| 9 | F |  | F |
| 10 | C |  | C |
| 11 | F |  | F |
| 2 | F | F | F |
| 8 | C | C | C |

FIG. 26

PROCESS 0

| GLOBAL NUMBER | PRESENT DISCLOSURE | RELATED ART |
|---|---|---|
| 0 | F | F |
| 1 | C | C |
| 2 | F | F |
| 6 | C | C |
| 7 | F | F |
| 8 | C | C |
| 3 | C | - |
| 9 | F | - |

PROCESS 1

| GLOBAL NUMBER | PRESENT DISCLOSURE | RELATED ART |
|---|---|---|
| 3 | C | F |
| 4 | F | C |
| 5 | C | F |
| 9 | F | C |
| 10 | C | F |
| 11 | F | C |
| 2 | F | - |
| 8 | C | - |

PARALLEL PROCESSING APPARATUS, PARALLEL COMPUTING METHOD, AND RECORDING MEDIUM STORING PARALLEL COMPUTING PROGRAM

CROSS-REFERENCE TO RELATED APPLICATION

This application is based upon and claims the benefit of priority of the prior Japanese Patent Application No. 2017-110981, filed on Jun. 5, 2017, the entire contents of which are incorporated herein by reference.

FIELD

The embodiments discussed herein are related to a parallel processing apparatus, a parallel computing method, and a recording medium storing a parallel computing program.

BACKGROUND

Most of fluid analyses and electromagnetic field analyses using a technique, such as a finite element method or a finite volume method, come down to a problem of solving a system of linear equations. A nonstationary iterative method such as a conjugate gradient method (CG method) is used to solve a system of linear equations numerically.

The related art is disclosed in K. Stuben,"Algebraic Multigrid (AMG): An Introduction with Applications", GMD-Report 70, Nov. 10, 1999, [online], <https://www.scai.fraunhofer.de/content/dam/scai/de/documents/AllgemeineDo kumentensammlung/SchnelleLoeser/SAMG/AMG_Introduction.pdf> and David M. Alber and Luke N. Olson, *Numer. Linear Algebra Appl.*, 14, 611-643, 2007.

As described above, when a hierarchical structure in the AMG method is to be generated in parallel, it is important to set C points and F points in each area so that a contradiction with the coefficient matrix of the entire computational model does not arise. This is because such setting causes the computational accuracy to be improved, and inhibits an increase in the number of iterations performed until a solution is obtained, while the convergence to a solution is guaranteed.

In one aspect, an object of the embodiments is to provide a parallel processing apparatus, a parallel computing method, and a parallel computing program which achieve higher computational accuracy and fast calculation due to suppression of an increase in the number of iterations, even when the number of computers in parallel is increased.

SUMMARY

According to an aspect of the embodiments, a parallel processing apparatus includes: a plurality of processors; and a network switch that couples the plurality of processors to each other, wherein a first processor among the plurality of processors: generates divided matrix data, when processing matrix data using a parallel processing based on an algebraic multigrid method and determining a C point or an F point, by dividing the matrix data in such a manner that an overlapping portion is present with each other; transmits the divided matrix data to a second processor which is different from the first processor and is included in the plurality of processors; generates first evaluation-value matrix data from the divided matrix data; transmits, to the second processor, first elements in a first overlapping portion of the first evaluation-value matrix data; receives, from the second processor, second elements of a second overlapping portion of second evaluation-value matrix data which is generated by the second processor; calculates first added evaluation data by adding the second elements to the first elements; transmits the first added evaluation data to the second processor; receives, from the second processor, second added evaluation data which is calculated by the second processor; and calculates a first C point or a first F point based on the first evaluation-value matrix data which is updated by inputting the second added evaluation data to the first evaluation-value matrix data.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 12 illustrates exemplary coefficient matrixes generated by the process 0 and the process 1 from the computational mesh divided in FIG. 11;

FIG. 13 illustrates exemplary tables of the process 0 and the process 1 in FIG. 12;

FIG. 16 illustrates an exemplary process (A2) of adding evaluation values λ;

FIG. 18 illustrates an exemplary process (A4) of updating evaluation values λ;

FIG. 19 illustrates exemplary CF setting processing performed on each point;

FIG. 24 illustrates an exemplary process (B3) of updating CF settings, which is performed by a CF update processor;

FIG. 26 illustrates exemplary C/F point settings;

DESCRIPTION OF EMBODIMENTS

For example, depending on the properties of a coefficient matrix representing a system of linear equations, application of only the conjugate gradient (CG) method as it is may cause a large number of iterations performed until a solution is obtained, or may cause failure of acquisition of a solution. In this case, preprocessing on the coefficient matrix achieves improvement in convergence to a solution.

For example, as the preprocessing, an algebraic multigrid (AMG) method may be used. In the AMG method, a computational grid is hierarchically coarse-grained by using the structure and properties of the coefficient matrix, and a process (smoothing) of removing error components which worsen the convergence is performed on each hierarchical level. The AMG method is preprocessing having a high improvement effect on convergence to a solution.

Figure 1:
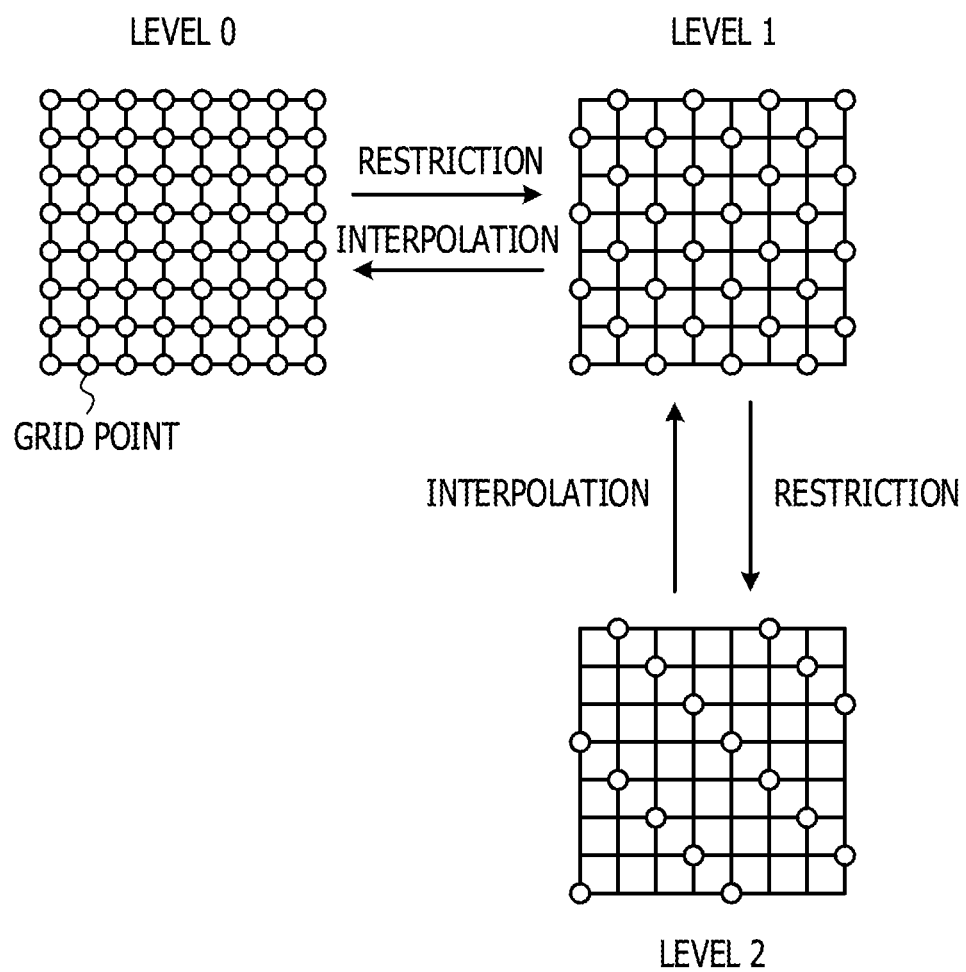
FIG. 1 illustrates an exemplary general outline of an algebraic multigrid (AMG) method.
Figure 2:
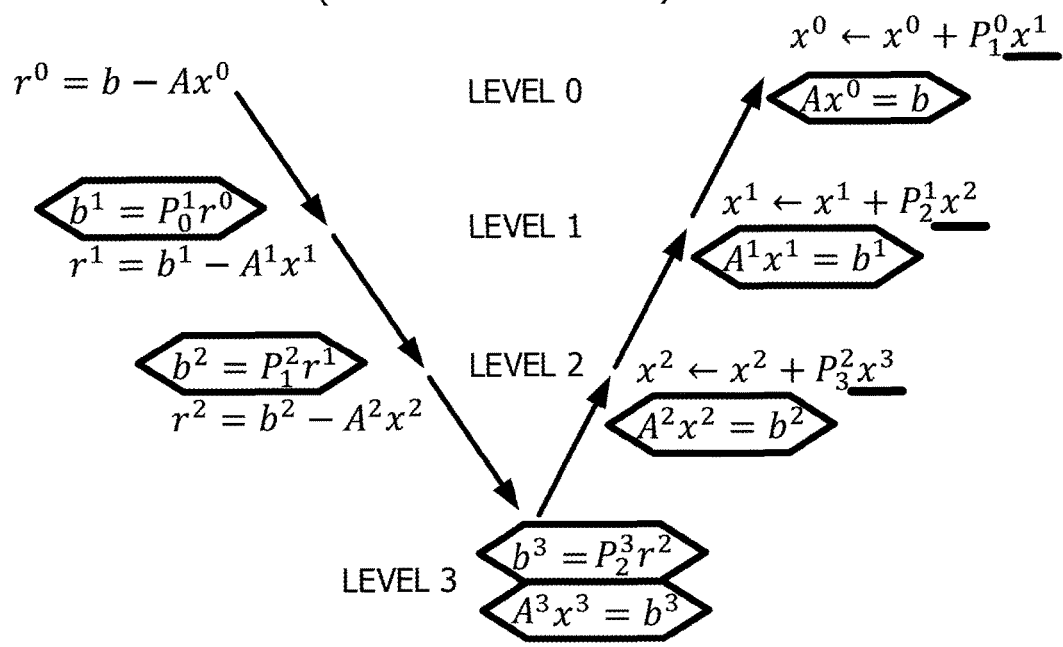
FIG. 2 illustrates an exemplary outline process flow of the AMG method.

FIGS. 1 and 2 illustrate a general outline of the AMG method. The vertexes (grid points) of a computational mesh of a computational model illustrated in FIG. 1 are hierarchically coarse-grained. An object of the AMG method is that convergence in an iterative method is improved in such a manner that, in a space from which grid points have been thinned out, a system of linear equations is solved for each hierarchical level by using the Gauss-Seidel method or the like. For example, as illustrated in FIG. 2, smoothing is hierarchically performed on the level 0, the level 1, the level 2, and the level 3 in this sequence. Then, in the reverse order, smoothing is performed on the level 3, the level 2, the level 1, and the level 0 in this sequence. Therefore, C points which are to remain in the next hierarchical level are to be selected, and an interpolation matrix for recovering F points from the C points in the processing performed in the reverse order is to be obtained. A grid point to remain in the next hierarchical level is called a C point, and a thinned-out grid point is called an F point. In the AMG method, error components of all wavelengths are rapidly removed by making combined use of multiple size grids, resulting in improvement of the calculation accuracy and improvement in the convergence.

Figure 3:
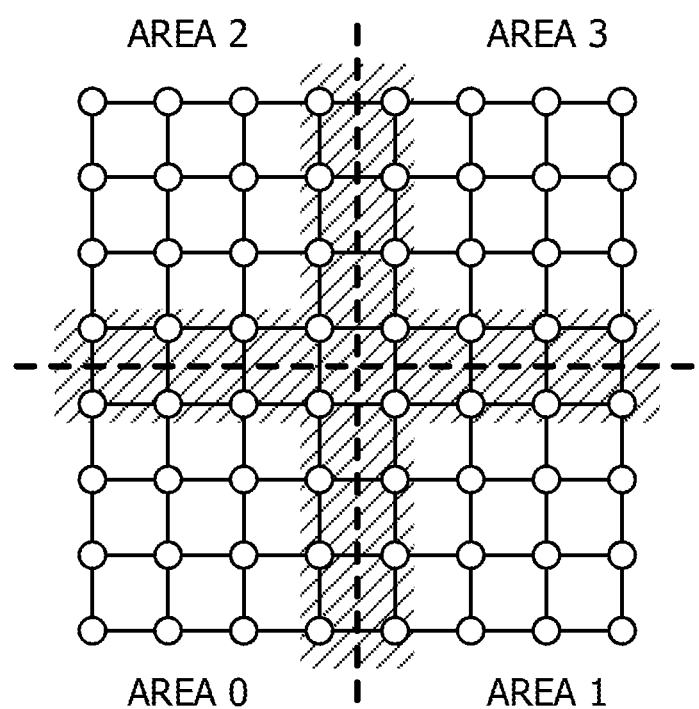
FIG. 3 illustrates exemplary division of a computational mesh representing a computational model in distributed-memory parallel computing.

For example, a larger amount of computational model handled in computation may cause an insufficient amount of memory in a single computer, resulting in failure of the computation. Therefore, the computational model is divided into multiple areas, and the divided areas are allocated to multiple computers for parallel computing. The parallel computing using the memories in the multiple computers may be called distributed-memory parallel computing. In the distributed-memory parallel computing, as illustrated in FIG. 3, a computational mesh is divided into the area 0, the area 1, the area 2, and the area 3. Each area is allocated to a computer (process) responsible for the area. In the distributed-memory parallel computing, a hierarchical structure according to the AMG method is generated for each area.

Figure 4:
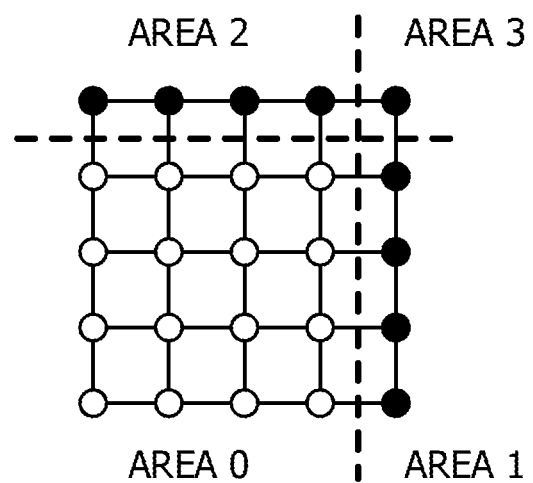
FIG. 4 is an enlarged view of an example of the area 0 in FIG. 3.

In the distributed-memory parallel computing, a hierarchy is generated according to the AMG method by using only information about a divided area. For example, a hierarchical structure is generated without consideration of the connection relationship between grid points across a boundary of an area. For example, in the area boundary portion indicated by the shaded area in FIG. 3, setting to a C point or an F point (C/F point setting) may be performed even in consideration of the connection relationship of grid points in adjacent areas. For example, in the area 0 illustrated in FIG. 4, the black grid points form boundary portions of the area 1, the area 2, and the area 3. A black area is called a "wing area". The area to which a grid point in a wing area belongs is called a "primary responsible area" of the grid point.

The AMG method performs a hierarchizing process involving the following processes: C/F point setting using the connection relationship, which is represented by the coefficient matrix of the entire computational model, between grid points; generation of an interpolation matrix; and generation of a coefficient matrix of the next hierarchical level. Error components specific to each hierarchical level are removed through smoothing, achieving improvement in convergence to a solution of a system of linear equations. For example, when C/F point setting is performed without consideration of the connection relationship with the grid points in a wing area, information about the entire computational model may fail to be reflected in generation of an interpolation matrix and generation of a coefficient matrix of the next hierarchical level which are performed afterwards. This may cause the computational accuracy and the convergence to a solution to be worsened when an area is divided for parallel computing. For example, as the number of divided areas, that is, the number of computers in parallel is increased, a divided area is decreased in size compared with the entire area. Therefore, the tendency of worsening the computational accuracy and the convergence to a solution may more noticeably appear. Holding information about the entire computational model in every process is not realistic in terms of the amount of memory.

In generation of hierarchical structures according to the AMG method in parallel, C points and F points are set in each area so that a contradiction with the coefficient matrix of the entire computational model does not arise. Thus, the computational accuracy may be improved and the convergence to a solution may be guaranteed, resulting in a reduction in the number of iterations performed until a solution is obtained.

A parallel processing apparatus may be provided which achieves improvement of the computational accuracy, a reduction in the number of iterations, and fast calculation, for example, even when the number of computers in parallel is increased.

The parallel processing apparatus processes matrix data in computational parallel processing using the algebraic multigrid method. In C-point/F-point (C/F point) determination, the parallel processing apparatus generates pieces of divided matrix data which are obtained by dividing the matrix data so that overlapping portions are present. The parallel processing apparatus includes a partial-area evaluation-value calculation processor, an evaluation-value update processor, and a partial-area CF setting unit which serve as a parallel coarse-graining processor. The parallel processing apparatus desirably includes a CF update processor, and further includes other units when desirable.

The algebraic multigrid method (AMG method), as having a word, "algebraic", in its name, coarse-grains a computational grid hierarchically by using the properties and structure of the coefficient matrix, and removes, at each hierarchical level, error components which cause the convergence to be worsened. A coefficient matrix represents connection relationships between grid points. In the AMG method, an interpolation matrix P and a coefficient matrix A of a next hierarchical level are generated. The interpolation matrix P is used to recover F points from C points based on the C points or the F points which have been set. C/F point setting (parallel coarse-graining processing) is important because it directly relates to the computational accuracy and the convergence in the AMG method. That is, determination of C points that are to remain in the next hierarchical level and F points that are to be thinned out leads to generation of an interpolation matrix P for recovering the F points from the C points, resulting in generation of a coefficient matrix A of the next hierarchical level from the interpolation matrix P. Appropriate setting of C points and F points leads to generation of an interpolation matrix for recovering the F points, which is followed by generation of a coefficient matrix of the next hierarchical level.

Figure 5:
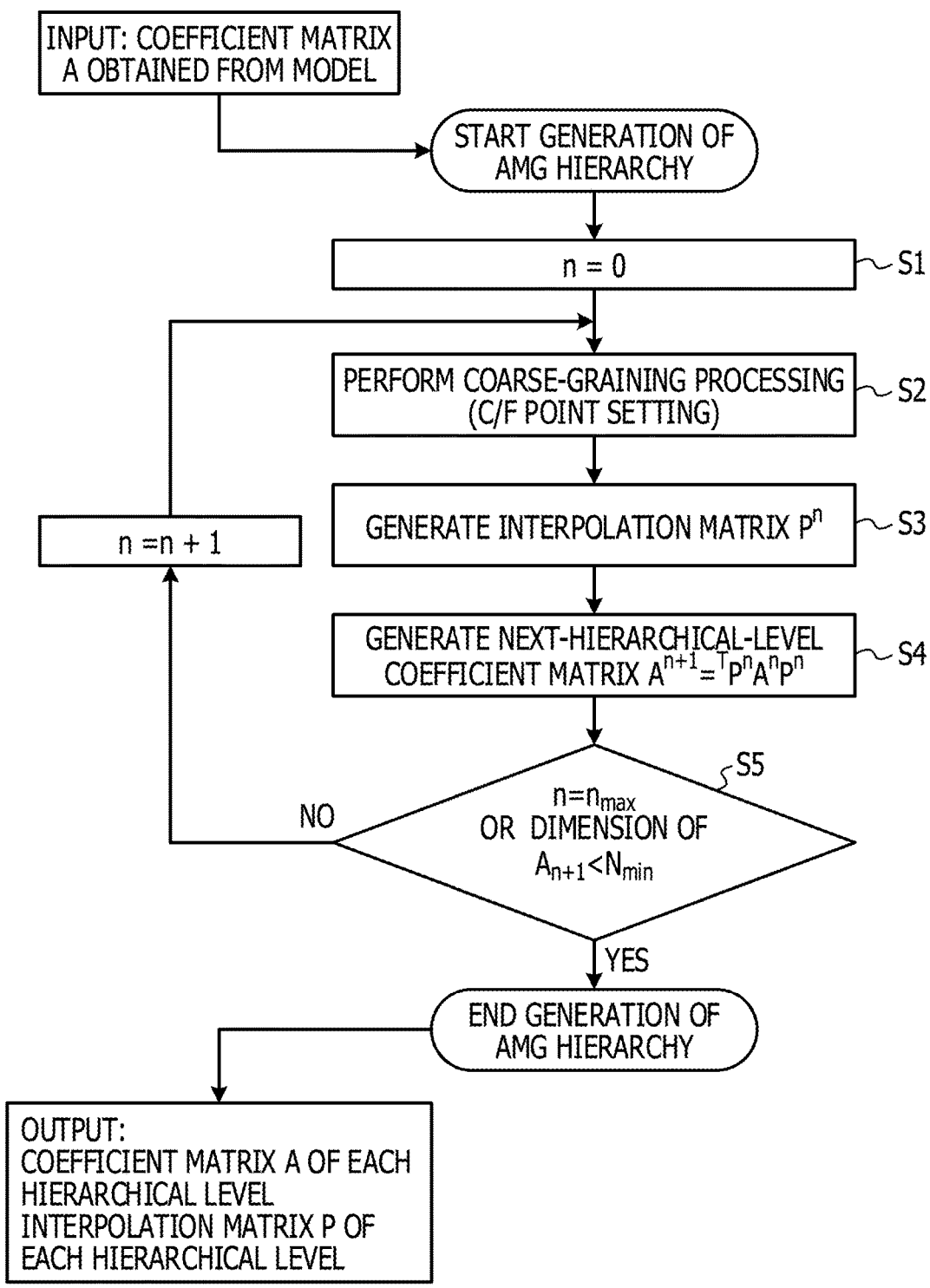
FIG. 5 illustrates an exemplary AMG method process.

FIG. 5 illustrates an exemplary AMG method process. In step S1, the parallel processing apparatus receives, as an input, a coefficient matrix A obtained by discretizing a computational model, and sets n to 0. Then, the process proceeds to S2.

In step S2, a coarse-graining processor 10 makes settings of the grid points at the hierarchical levels (performs C/F point setting). Then, the process proceeds to S3.

In step S3, the coarse-graining processor 10 generates an interpolation matrix $P^n$ (a matrix for recovering the grid points at the level n−1 from the level n) and a coefficient matrix A of the hierarchical level. Then, the process proceeds to S4.

In step S4, the coarse-graining processor 10 calculates, as a matrix product $^TP^n A^n P^n$, a coefficient matrix $A^{n+1}$ of the next hierarchical level from the interpolation matrix $P^n$, its transposed matrix $^TP$, and the coefficient matrix $A^n$ of the current hierarchical level. Then, the process proceeds to S5.

In step S5, if a condition, $n=n_{max}$ or the dimension of $A_{n+1}<N_{min}$, is not satisfied, the coarse-graining processor 10 fulfills an equation, n=n+1. Then, the process proceeds to S2. In contrast, if the condition, $n=n_{max}$ or the dimension of $A_{n+1}<N_{min}$, is satisfied, the coarse-graining processor 10 ends the process. For example, the coarse-graining processor 10 repeatedly performs the series of processes until a predetermined number of hierarchical levels are processed or until the number of rows of a coefficient matrix reaches a given number. The coarse-graining processor 10 may set the number of hierarchical levels and the minimum number of rows of a coefficient matrix to any values. The coarse-graining processor 10 may repeatedly perform the processes until no C points that are to remain in the next hierarchical level are present.

The process of generating coefficient matrixes from computational model data in parallel, the process of generating an interpolation matrix $P^n$, and the process of generating a coefficient matrix $A^{n+1}$ of the next hierarchical level may be performed by using existing methods.

Figure 6:
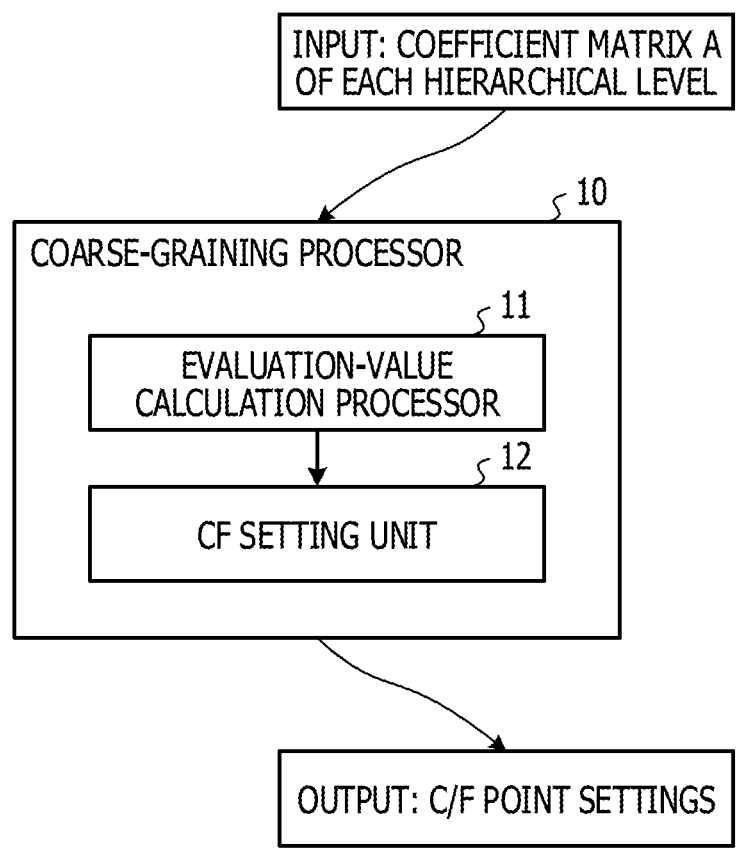
FIG. 6 illustrates an exemplary process of a coarse-graining processor in the AMG method.

FIG. 6 illustrates an exemplary process of the coarse-graining processor according to the AMG method. The coefficient matrix A of each hierarchical level is used as an input. The coarse-graining processor 10 includes an evaluation-value calculation processor 11 and a CF setting unit 12. The evaluation-value calculation processor 11 calculates evaluation values λ used in C/F point determination. The CF setting unit 12 performs C/F point setting on grid points, based on the evaluation values λ.

Information about C/F points which have been set is output.

Figure 7:
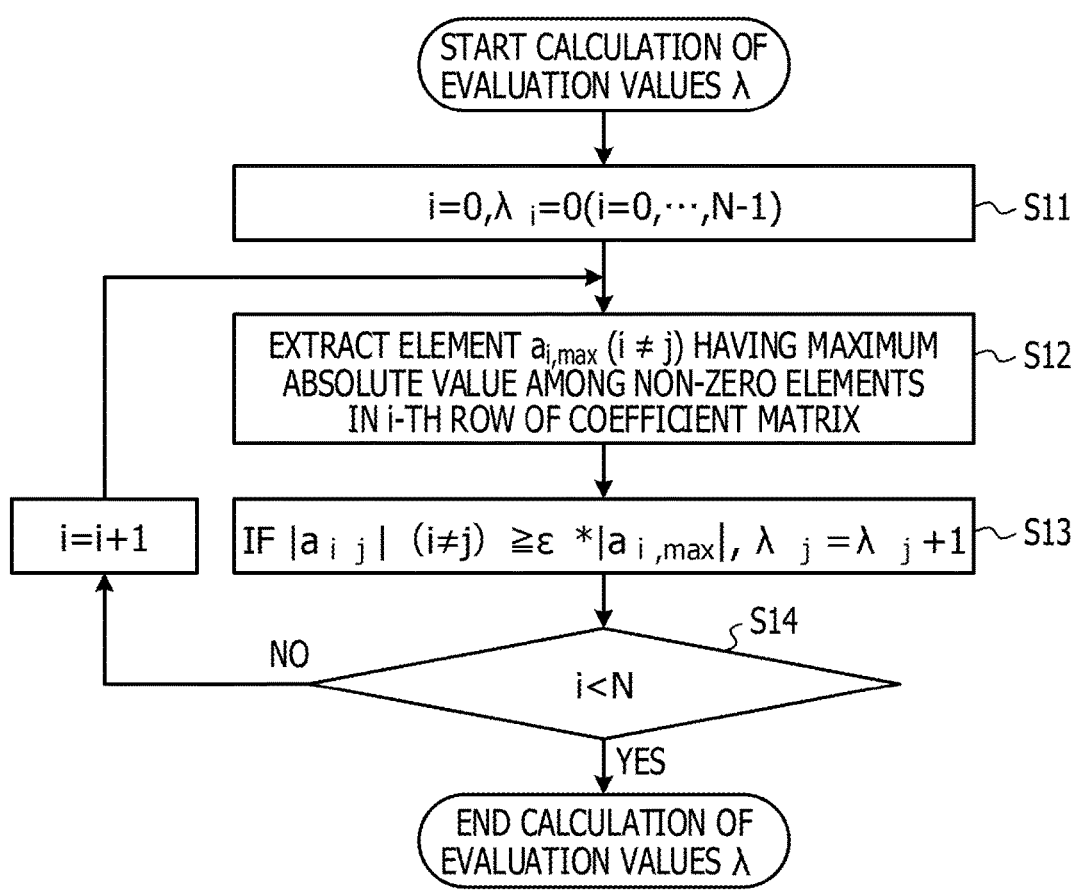
FIG. 7 illustrates an exemplary process of calculating evaluation values λ, which is performed by a coarse-graining processor.

FIG. 7 illustrates an exemplary process of the evaluation-value calculation processor 11.

In step S11, the evaluation-value calculation processor 11 receives the coefficient matrix A (i=0, $\lambda_i$=0 (i=0, . . . , N−1)) of each hierarchical level. Then, the process proceeds to S12.

In step S12, the evaluation-value calculation processor 11 determines whether or not the point i and the point j has a strong connection relationship based on the element $a_{ij}$ in the coefficient matrix A. The evaluation-value calculation processor 11 extracts an element $a_{i,max}$ (i≠j) having the maximum absolute value among the non-zero elements in the i-th row of the coefficient matrix. Then, the process proceeds to S13.

In step S13, if the absolute value of the element $a_{ij}$ (i≠j) is greater than or equal to a value obtained by multiplying, by a threshold ε, the element $a_{i,max}$ having the maximum absolute value, for example, if $|a_{ij}|(i\neq j) \geq \varepsilon \times |a_{i,max}|$, the evaluation-value calculation processor 11 fulfills an equation, $\lambda_j=\lambda_j+1$. Then, the process proceeds to S14. The threshold ε is a constant satisfying a condition, 0<ε<1. The threshold ε which is equal to 0.25 is often used. However, a user may set the threshold ε to any value.

In step S14, the evaluation-value calculation processor 11 determines whether or not i is less than N. If the evaluation-value calculation processor 11 determines that i is less than N, the evaluation-value calculation processor 11 fulfills an equation, i=i+1. Then, the process returns to S12. If the evaluation-value calculation processor 11 determines that i is N or more, the evaluation-value calculation processor 11 ends the process. An evaluation value λ indicates the number of grid points having strong connections. The evaluation values λ are used to perform the subsequent C/F point setting process.

Figure 8:
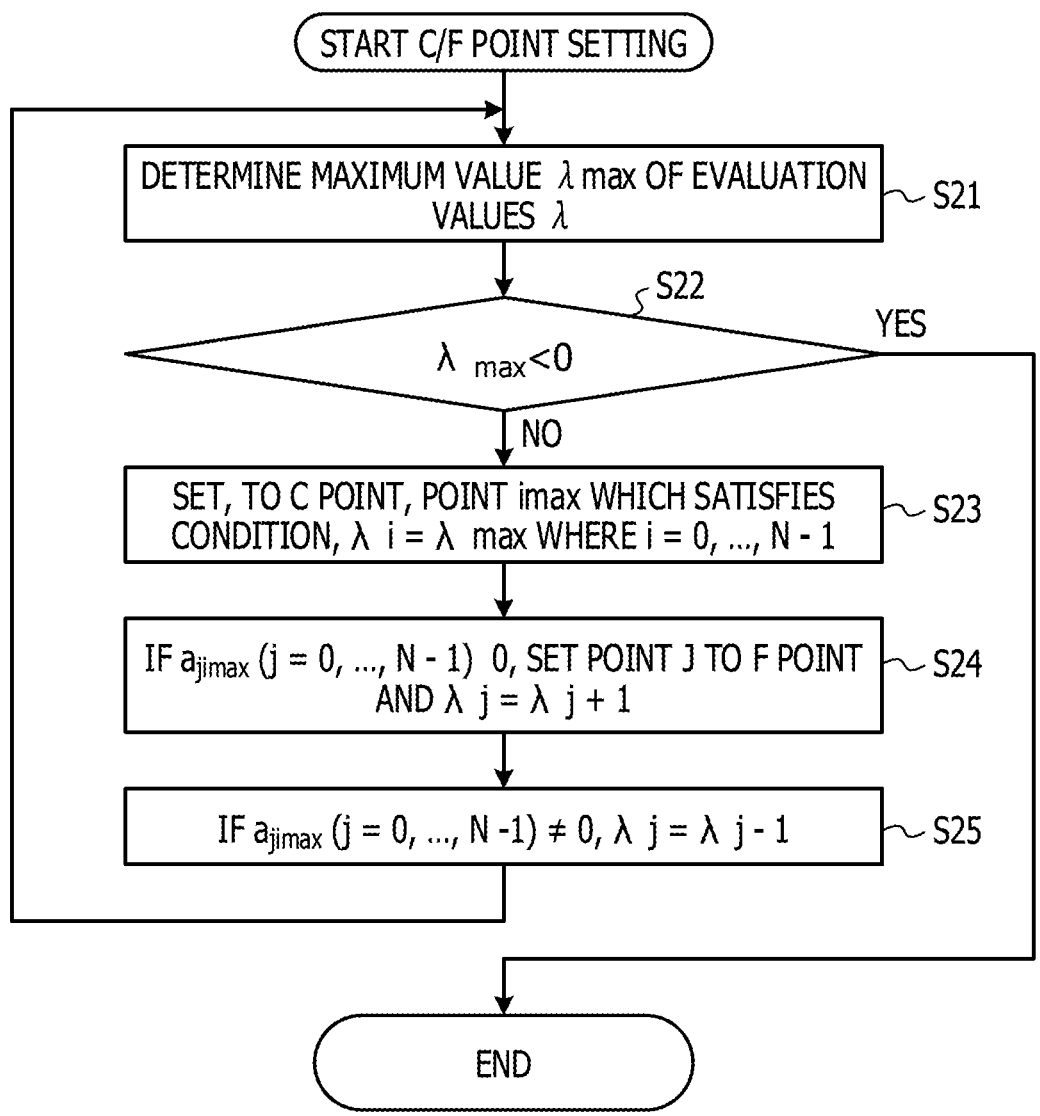
FIG. 8 illustrates an exemplary process of a CF setting unit.

FIG. 8 illustrates an exemplary C/F point setting process of the CF setting unit 12.

In step S21, the CF setting unit 12 determines the maximum value $\lambda_{max}$ of the evaluation values λ. Then, the process proceeds to S22.

In step S22, the CF setting unit 12 determines whether or not the maximum value $\lambda_{max}$ of the evaluation values λ is less than 0. If the CF setting unit 12 determines that the maximum value $\lambda_{max}$ is greater than or equal to 0, the process proceeds to S23. If the CF setting unit 12 determines that the maximum value $\lambda_{max}$ is less than 0, the process ends. That is, when C/F point setting has been performed on all of the grid points, the coarse-graining processing is completed.

In step S23, the CF setting unit 12 sets, to a C point, the point $i_{max}$ which satisfies a condition, $\lambda_i=\lambda_{max}$ where i= 0, . . . , N−1. For example, the CF setting unit 12 sets, to a C point, such a point that the evaluation value $\lambda_j$ of the grid point j is maximum. Then, the process proceeds to S24.

In step S24, if $a_{jimax}$ (j=0, . . . , N−1) is not equal to zero, the CF setting unit 12 sets the point j to an F point. For example, the CF setting unit 12 sets, to an F point, a point connected to a C point, and fulfills an equation, $\lambda_j=\lambda_j+1$. Then, the process proceeds to S25.

In step S25, if $a_{imaxj}$ (j=0, . . . , N−1) is not equal to zero, the CF setting unit 12 fulfills an equation, $\lambda_j=\lambda_j-1$. Then, the process proceeds to S21.

The CF setting unit 12 performs C/F point setting in any way. For example, the CF setting unit 12 sets, to a C point, a grid point having the maximum evaluation value λ. When multiple points have the maximum evaluation value λ, a point having the smallest grid point number is often set as a C point. For example, the CF setting unit 12 may set, to a C point, a point having the largest grid point number. In this case, C points and F points which are different from those described above may be set.

The partial-area evaluation-value calculation processor transmits pieces of divided matrix data to the nodes. The partial-area evaluation-value calculation processor causes each node to generate evaluation-value matrix data from the corresponding piece of divided matrix data. The partial-area evaluation-value calculation processor performs a similar process to the process of the evaluation-value calculation processor 11 illustrated in FIG. 7, except that the process is performed in parallel.

The evaluation-value update processor causes each node to transmit, to its connected nodes, the overlapping-portion elements of the evaluation-value matrix data. The evaluation-value update processor causes each node to receive, from its connected nodes, the overlapping-portion elements of the evaluation-value matrix data. Each node adds the received overlapping-portion elements to the corresponding elements of the evaluation-value matrix data so as to calculate added evaluation data. Each node transmits the added evaluation data to its connected nodes. Each node inputs the received added evaluation data to the evaluation-value matrix data. The expression "its connected node" means that the connection relationship between the pieces of divided matrix data is considered for the pieces of divided matrix data obtained by dividing the matrix data in such a manner that overlapping portions are present. The evaluation values λ obtained by the evaluation-value update processor are obtained in consideration of the connection relationship with matrix elements in an overlapping portion of each adjacent area. Therefore, even when the processes are performed in parallel, the result is not contradictory to a result obtained when C/F point setting is performed on the entire data.

The partial-area CF setting unit causes each node to perform C/F point calculation based on the updated evaluation-value matrix data. The partial-area CF setting unit performs a similar process to the process of the CF setting unit 12 illustrated in FIG. 8, except that the process is performed in parallel.

C/F points of the grid points in a wing area are set for a partial area, but may be different from C/F points which are set for the primary responsible area. A contradiction may arise in the process of generating an interpolation matrix and the process of generating a coefficient matrix of the next hierarchical level which are subsequently performed, resulting in incorrect generation of an AMG hierarchy. Therefore, the CF update processor updates the C/F points in accordance with the correct settings.

The CF update processor causes each node to transmit, to its connected node, information about calculated C/F points of the elements in an overlapping portion. The CF update processor causes each node to receive, from its connected node, information about calculated C/F points of the elements in an overlapping portion. Then, the CF update processor causes each node to update the C/F points of the elements in an overlapping portion with the C/F points corresponding to the received information about C/F points. The "information about calculated C/F points" includes the global numbers of the calculated C/F points.

Figure 9:
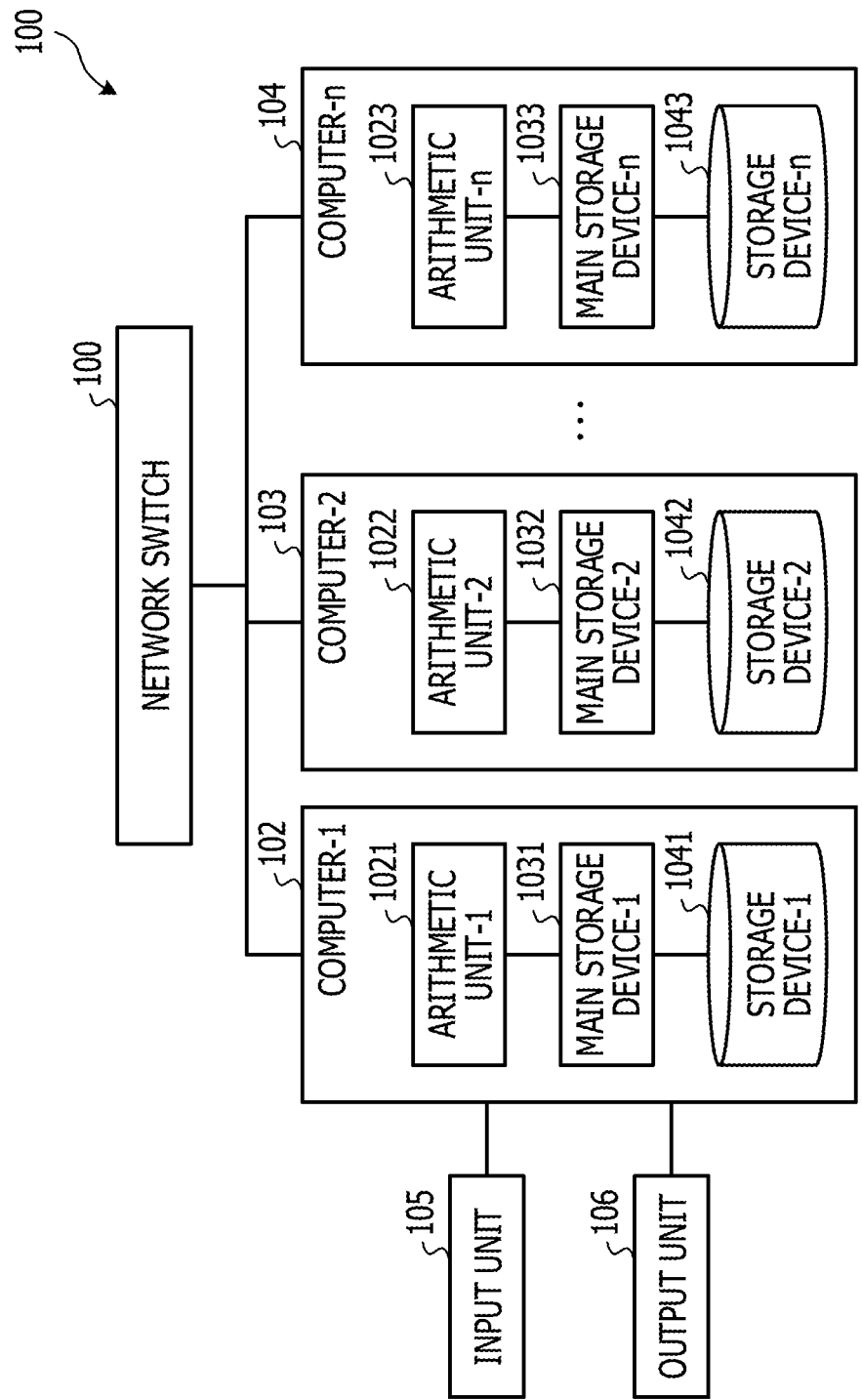
FIG. 9 illustrates an exemplary hardware configuration of a parallel processing apparatus.

FIG. 9 illustrates an exemplary hardware configuration of the parallel processing apparatus. In main storage devices and storage devices which are described below and which are included in a parallel processing apparatus 100 in FIG. 9, a parallel computing program is recorded. Arithmetic units read the program for execution so as to operate as a partial-area evaluation-value calculation processor 111, an evaluation-value update processor 112, a partial-area CF setting unit 113, and a CF update processor 114.

The parallel processing apparatus 100 in FIG. 9 includes a computer-1 102, a computer-2 103, . . . , and a computer-n 104 which are connected to one another through a network switch 101. The parallel processing apparatus 100 is connected to an input unit 105 and an output unit 106.

The computer-1 102 includes an arithmetic unit-1 1021, a main storage device-1 1031, and a storage device-1 1041. The computer-2 103 includes an arithmetic unit-2 1022, a main storage device-2 1032, and a storage device-2 1042. The computer-n 104 includes an arithmetic unit-n 1023, a main storage device-n 1033, and a storage device-n 1043.

The arithmetic unit-1 1021, the arithmetic unit-2 1022, . . . , and the arithmetic unit-n 1023 execute various programs for the partial-area evaluation-value calculation processor 111, the evaluation-value update processor 112, the partial-area CF setting unit 113, and the CF update processor 114. The various programs are stored, for example, in the main storage device-1 1031, the main storage device-2 1032, . . . , and the main storage device-n 1033, and the storage device-1 1041, the storage device-2 1042, . . . , and the storage device-n 1043.

The main storage device-1 1031, the main storage device-2 1032, . . . , and the main storage device-n 1033 include, for example, read only memories (ROMs) and random access memories (RAMs), and store programs and data for the processes included in the parallel processing apparatus 100.

Examples of the storage device-1 1041, the storage device-2 1042, . . . , and the storage device-n 1043 include magnetic disk devices, optical disk devices, and magneto-optical disk devices. The storage device-1 1041, the storage device-2 1042, . . . , and the storage device-n 1043 store the above-described programs and data for the processes. When desirable, the programs and data may be loaded for use to the main storage device-1 1031, the main storage device-2 1032, . . . , and the main storage device-n 1033.

The network switch 101 is a device which is connected to multiple apparatuses through a cable or the like and which exerts control for communication between the apparatuses so as to relay and transfer data from/to the apparatuses.

Examples of the input unit 105 include a keyboard, a mouse, a pointing device, and a touch panel. The input unit 105 is used to input an instruction from a user. In addition, the input unit 105 is used to input to-be-recorded information by driving a portable recording medium.

Examples of the output unit 106 include a display and a printer. The output unit 106 is used to display a processing result or the like to a user of the parallel processing apparatus 100.

To increase the computational processing speed, an accelerator, such as a graphics processing unit (GPU) or a field programmable gate array (FPGA), may be used.

Figure 10:
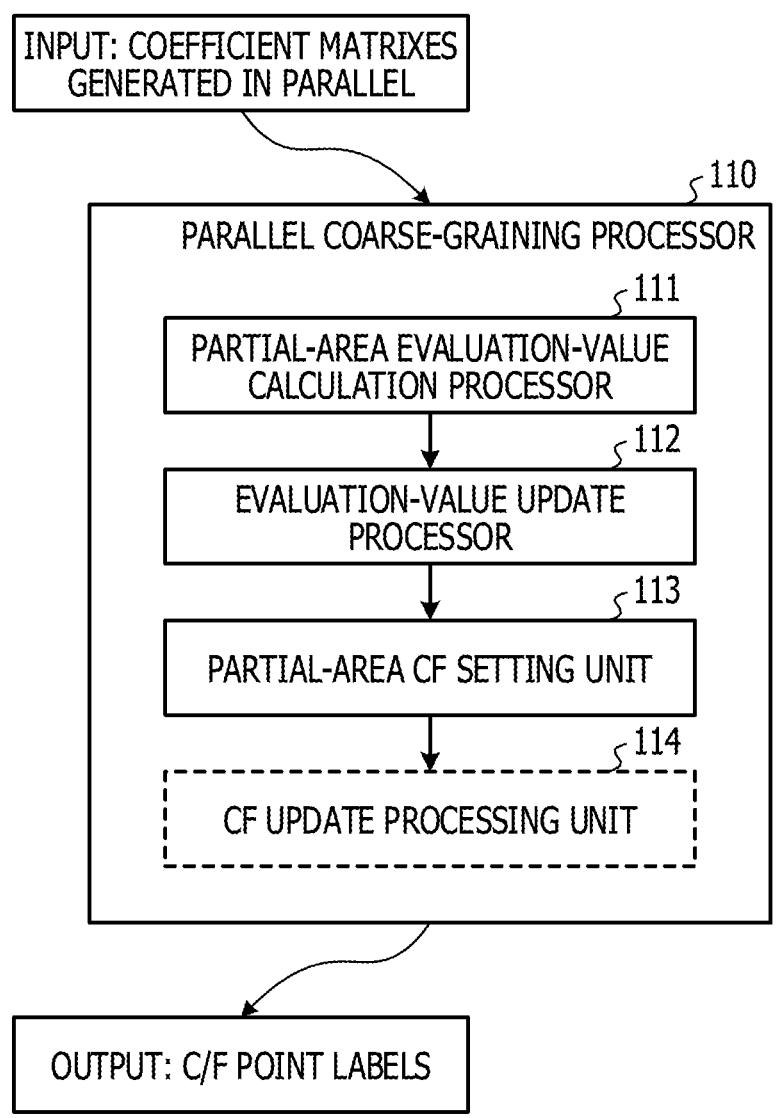
FIG. 10 illustrates an exemplary process of a parallel coarse-graining processor.

As illustrated in FIG. 10, the parallel processing apparatus includes a parallel coarse-graining processor 110 which performs a process of setting C/F points. The parallel coarse-graining processor 110 includes the partial-area evaluation-value calculation processor 111, the evaluation-value update processor 112, the partial-area CF setting unit 113, and the CF update processor 114. The processes performed by the partial-area evaluation-value calculation processor 111 and the partial-area CF setting unit 113 are performed according to the processes illustrated in FIGS. 7 and 8, respectively.

For example, the configurations of the partial-area evaluation-value calculation processor 111, the evaluation-value update processor 112, the partial-area CF setting unit 113, and the CF update processor 114 may correspond to the parallel processing apparatus. For example, the processes performed by the partial-area evaluation-value calculation processor 111, the evaluation-value update processor 112, the partial-area CF setting unit 113, and the CF update processor 114 may correspond to the parallel computing method. For example, the programs causing a computer to perform the processes of the partial-area evaluation-value calculation processor 111, the evaluation-value update processor 112, the partial-area CF setting unit 113, and the CF update processor 114 may correspond to the parallel computing program.

Figure 11:
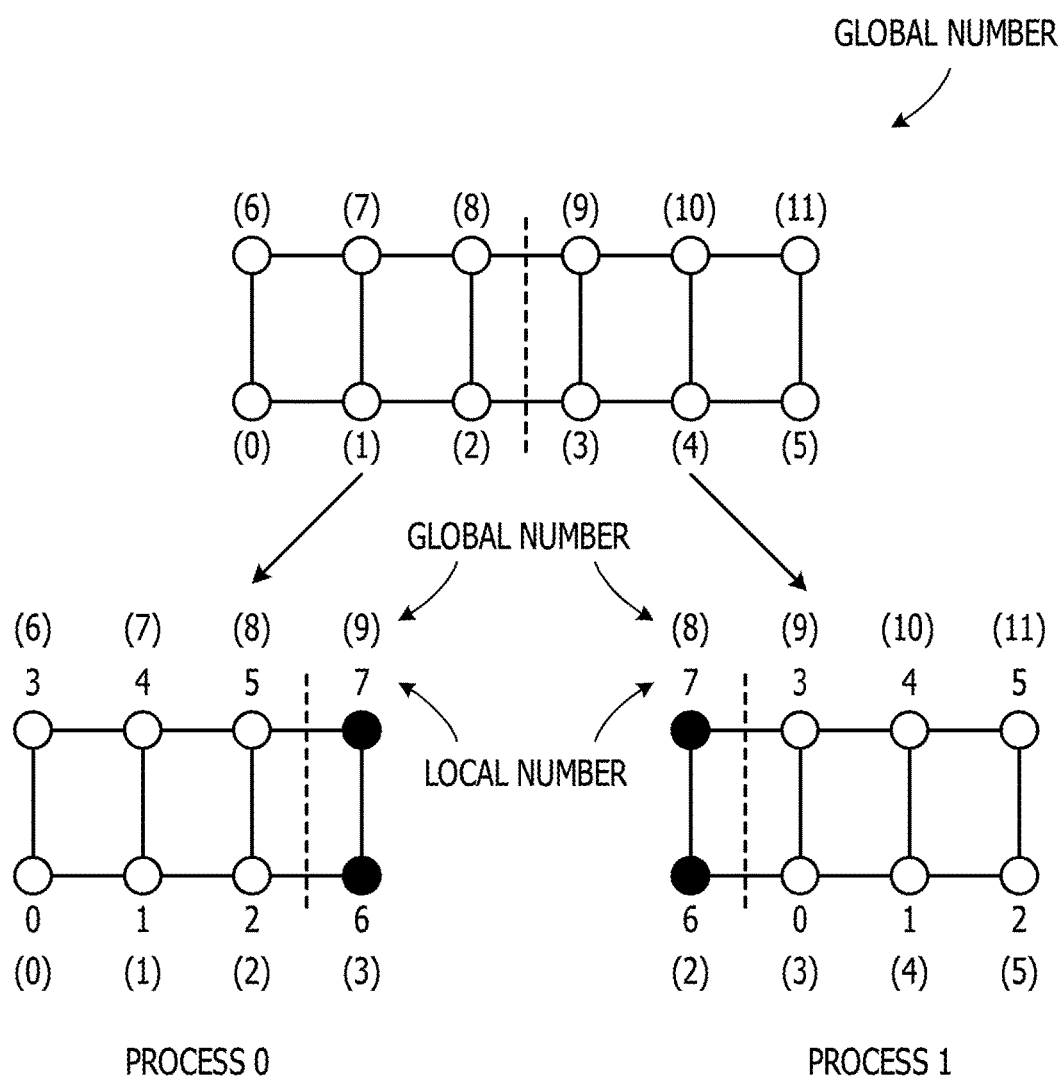
FIG. 11 illustrates an exemplary case in which a computational mesh having 12 points is divided between two processes.

As illustrated in FIG. 11, the case in which a computational mesh having 12 points is divided between two processes into two parts will be discussed. A black spot in FIG. 11 represents a grid point in a wing area. A white spot represents a grid point in a primary responsible area. A number without parentheses, which is assigned to the corresponding grid point, indicates a local number, that is, a grid point number which is unique in the process. A number with parentheses indicates a global number, that is, a grid point number that is unique in the entire computational mesh. The parallel coarse-graining processor 110 receives coefficient matrixes generated in parallel by the process 0 and the process 1 from the computational mesh illustrated in FIG. 11. FIG. 12 illustrates exemplary coefficient matrixes generated by the process 0 and the process 1 from the divided computational meshes.

As illustrated in FIG. 12, a portion surrounded by a solid line frame indicates a coefficient matrix in which numbers are assigned to the rows and the columns. Local numbers are the row numbers and the column numbers which are unique in each process. Global numbers are the row numbers and the column numbers which are unique in the entire computational model. In generation of a coefficient matrix, not only local numbers but also global numbers are assigned. The sixth column and the seventh column (a portion surrounded by a dotted line frame) of the process 0 indicate the wing area of the process 0. Similarly, the sixth column and the seventh column of the process 1 indicate the wing area of the process 1. By using the matrixes as input, the partial-area evaluation-value calculation processor 111 in FIG. 10 calculates evaluation values λ according to the process flow in FIG. 7. Then, the result in FIG. 13 is obtained. For example, when the 0th row in the local number of the process 0 is focused on, the 1st column and the 3rd column in the local number satisfy the condition. Therefore, $\lambda_1 = \lambda_1 + 1$ and $\lambda_3 = \lambda_3 + 1$. This process is sequentially performed on the rows. Then, the table in FIG. 13 is obtained.

In FIG. 13, portions surrounded by dotted line frames indicate wing areas of the processes. For example, when the evaluation values λ calculated in this stage are used, as they are, in the CF setting processing, the connection relationship with the grid points in the wing area may not be considered.

Figure 14:
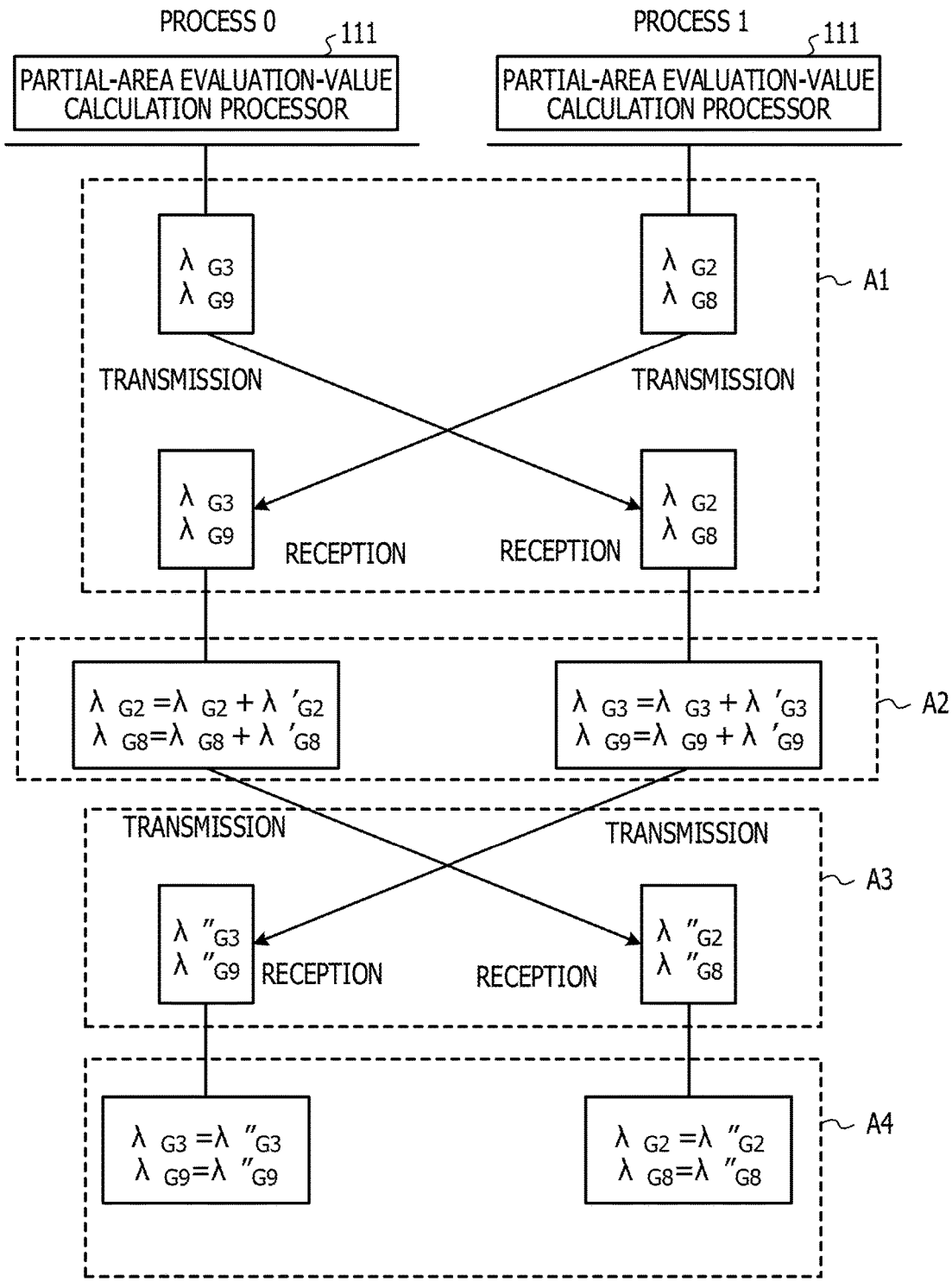
FIG. 14 illustrates an exemplary process of an evaluation-value update processor.

FIG. 14 is a block diagram illustrating a process pattern of the evaluation-value update processor 112. The numbers with 'G', such as G3 and G8 in FIG. 14, indicate global numbers. The partial-area evaluation-value calculation processor 111 causes each process to calculate evaluation values λ. Then, the evaluation-value update processor 112 performs evaluation-value update processing.

The evaluation-value update processor 112 performs a process (A1) of receiving/transmitting the evaluation values λ of a wing area, a process (A2) of adding the evaluation values λ, a process (A3) of receiving and transmitting the added evaluation values λ, and a process (A4) of updating the evaluation values λ. In the process (A1) of receiving and transmitting the values λ of a wing area, the evaluation-value update processor 112 transmits the evaluation values λ of the wing area, which are obtained by using a computer (process) that is responsible for the corresponding area, to the process responsible for the primary responsible area through a network. In the process (A2) of adding the evaluation values λ, the evaluation-value update processor 112 causes the process responsible for the primary responsible area to add the received evaluation values λ to those of the respective grid points. In the process (A3) of receiving and transmitting the added evaluation values λ, the evaluation-value update processor 112 causes the process responsible for the primary responsible area to transmit the added evaluation values λ back to the transmission source. In the process (A4) of updating the evaluation values λ, the evaluation-value update processor 112 causes the process for each area to update the evaluation values λ of the grid points with the evaluation values λ received from the process responsible for the primary responsible area.

Figure 15:
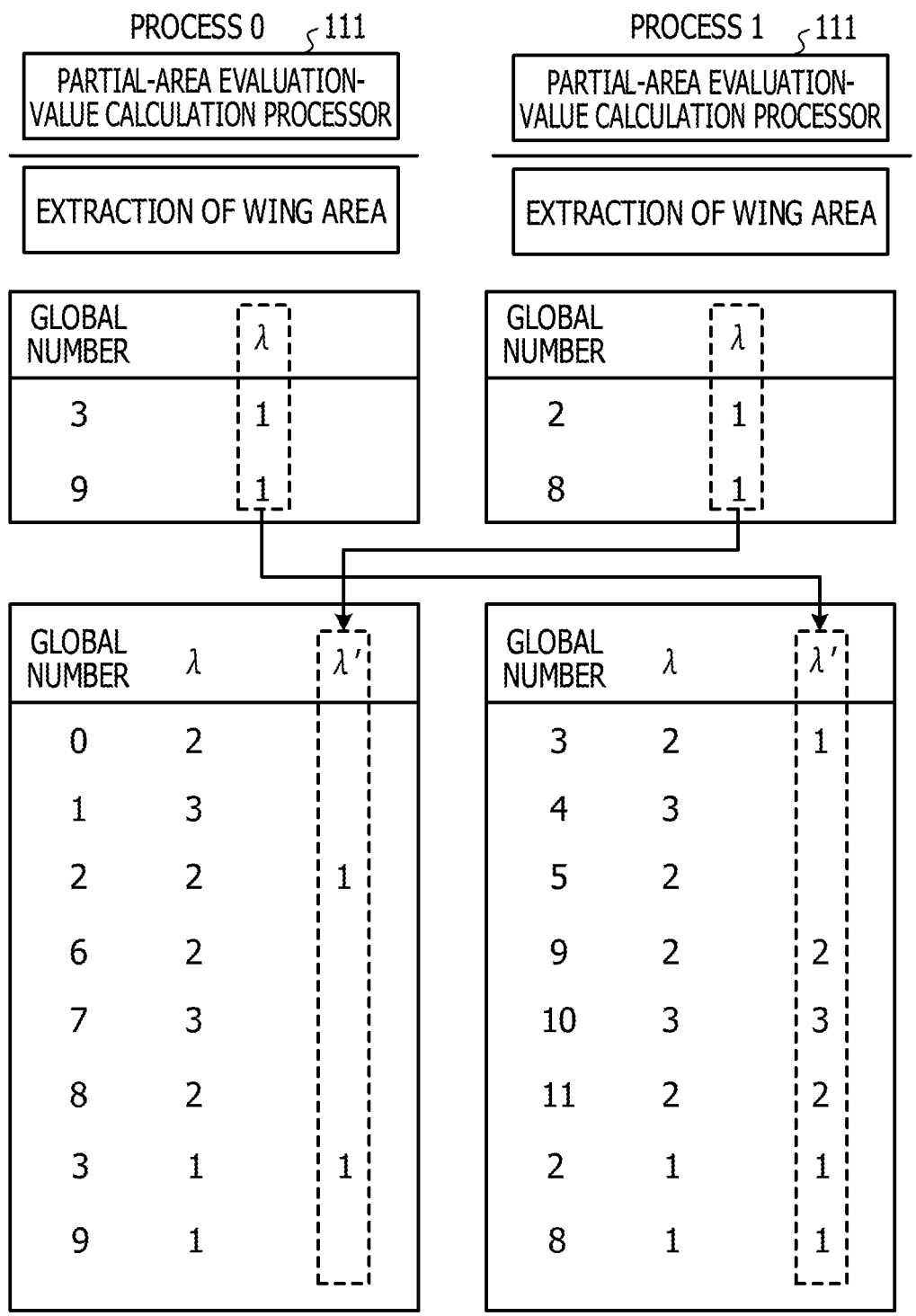
FIG. 15 illustrates an exemplary process (A1) of receiving and transmitting evaluation values λ of a wing area.

In the process (A1) of receiving and transmitting the evaluation values λ of a wing area, as illustrated in FIG. 15, each process for the partial-area evaluation-value calculation processing calculates evaluation values λ, and then extracts the global numbers and the evaluation values λ of the wing area. The extracted evaluation values λ are stored in a transmission buffer, and are transmitted to the process responsible for the primary responsible area. For example, the process 0 transmits the evaluation values λ of the global numbers 3 and 9 to the process 1. The process 1 transmits the evaluation values λ of the global numbers 2 and 8 to the process 0. The process 0 and the process 1 store the received evaluation values λ in reception buffers λ' in association with the global numbers.

In the process (A2) of adding the evaluation values λ, as illustrated in FIG. 16, each process adds, for each global number, the corresponding value in the reception buffer λ' to the corresponding evaluation value λ that has been calculated in the process. That is, the process 0 adds the evaluation values λ of the global numbers 2 and 8, which are transmitted from the process 1, to the evaluation values λ of the global numbers 2 and 8 which are calculated by the process 0 itself. Similarly, the process 1 performs addition on the evaluation values λ of the global numbers 3 and 9. The evaluation values λ are updated with the values obtained through the addition in each process.

Figure 17:
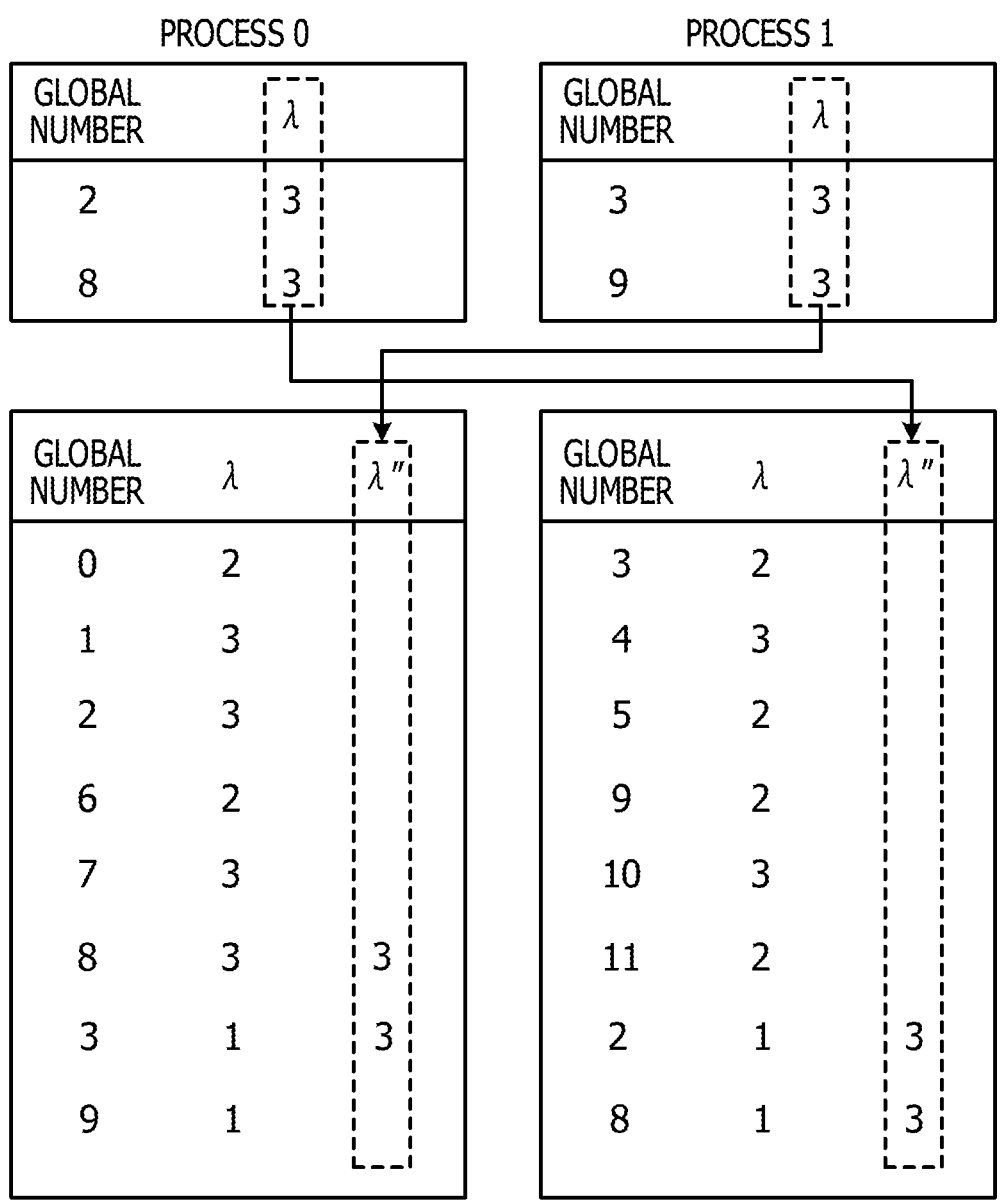
FIG. 17 illustrates an exemplary process (A3) of receiving and transmitting added evaluation values λ.

In the process (A3) of receiving and transmitting the added evaluation values λ, as illustrated in FIG. 17, each process stores, in the transmission buffer, the evaluation values λ corresponding to the received global numbers, and transmits the added values λ back to the transmission source. The process 1 has requested the process 0 to transmit the evaluation values λ of the global numbers 2 and 8. Therefore, the process 0 stores, in the transmission buffer, the added evaluation values λ corresponding to the numbers, and transmits the values back to the process 1. Similarly, the process 1 performs the process of transmitting values back. The evaluation values λ that have been transmitted back are stored in the reception buffer λ".

In the process (A4) of updating the evaluation values λ, as illustrated in FIG. 18, the evaluation values λ of each process are updated with the values in the reception buffer λ".

The evaluation-value update processor 112 performs the evaluation-value update processing so that evaluation values λ are obtained from the coefficient matrixes, which are generated in the processes, in consideration of all of the connection relationships between grid points. By using the updated evaluation values λ, the partial-area CF setting unit 113 causes each process to set each point to a C point or an F point according to the process flow illustrated in FIG. 8. The process flow in FIG. 8 is a process according to the AMG method. The evaluation values λ are obtained in consideration of all of the connection relationships between grid points. Therefore, even when the processes are performed in parallel, there will be no contradiction to the case in which C/F points are set by using all values. For example, as illustrated in FIG. 19, each point has been set to a C point or an F point.

Figure 20:
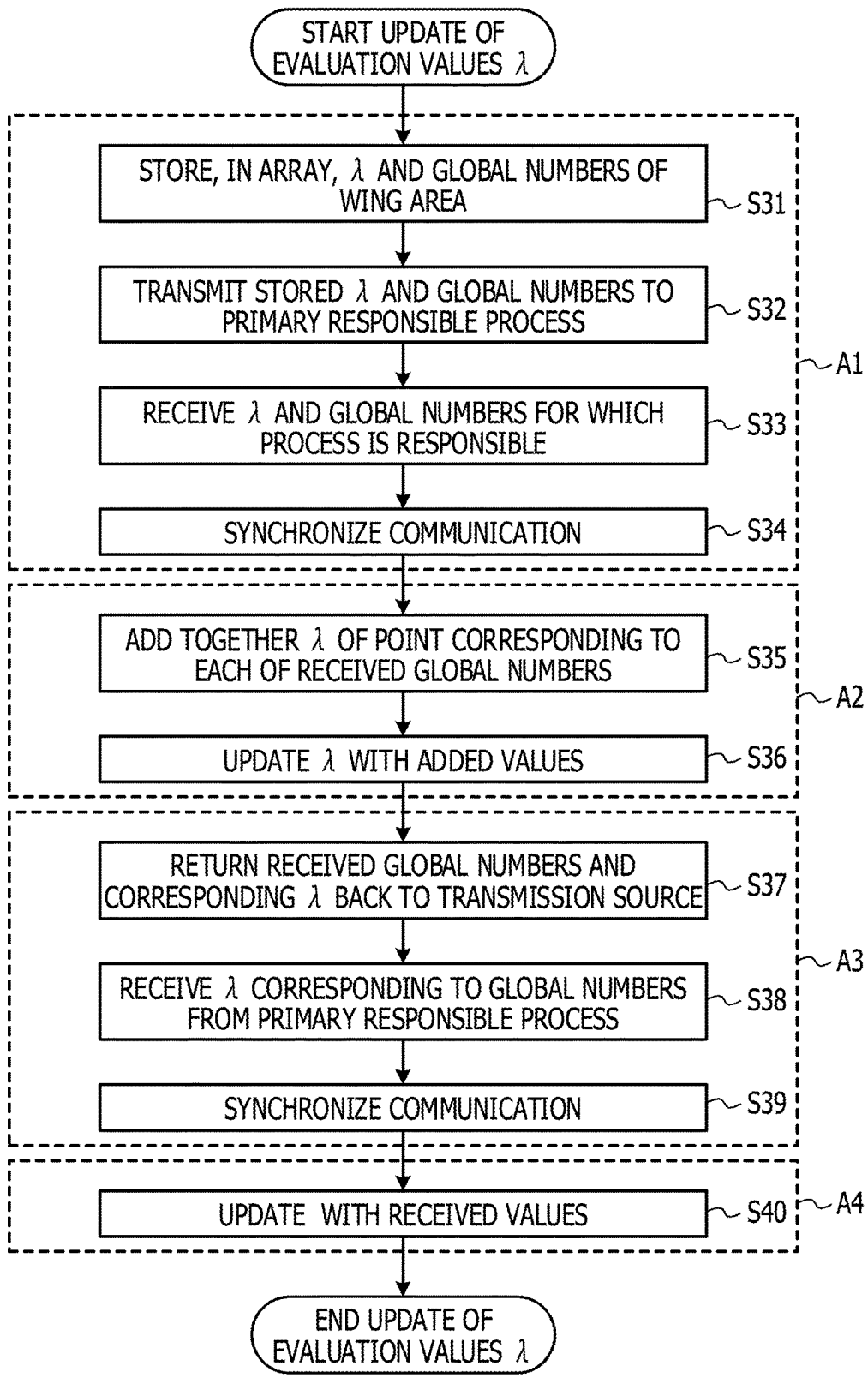
FIG. 20 illustrates an exemplary process of an evaluation-value update processor.

FIG. 20 illustrates exemplary evaluation-value update processing of the evaluation-value update processor.

In step S31, the evaluation-value update processor 112 stores, in an array, the evaluation values λ and the global numbers of the wing area. Then, the process proceeds to S32.

In step S32, the evaluation-value update processor 112 transmits the stored evaluation values λ and global numbers to the primary responsible process. Then, the process proceeds to S33.

In step S33, the evaluation-value update processor 112 causes the process to receive the evaluation values λ and the global numbers for which the process is responsible. Then, the process proceeds to S34.

In step S34, the evaluation-value update processor 112 synchronizes the communication. Then, the process proceeds to S35.

In step S35, the evaluation-value update processor 112 adds together the evaluation values λ of the point corresponding to each of the received global numbers. Then, the process proceeds to S36.

In step S36, the evaluation-value update processor 112 updates the evaluation values λ with the added values. Then, the process proceeds to S37.

In step S37, the evaluation-value update processor 112 returns the received global numbers and the evaluation values λ corresponding to the received global numbers back to the transmission source. Then, the process proceeds to S38.

In step S38, the evaluation-value update processor 112 receives the evaluation values λ corresponding to the global numbers from the primary responsible process. Then, the process proceeds to S39.

In step S39, the evaluation-value update processor 112 synchronizes the communication. Then, the process proceeds to S40.

In step S40, the evaluation-value update processor 112 updates the evaluation values λ with the received values. Then, the process ends.

Processes similar to those in FIGS. 9 to 19 may be provided, except that, for example, the partial-area CF setting unit 113 sets each grid point to a C point or an F point, and that the CF update processor 114 then updates C/F point settings of the grid points in a wing area so that the C/F point settings match those of the primary responsible area. Accordingly, the same configuration as the above-described configuration may not be described.

Figure 21:
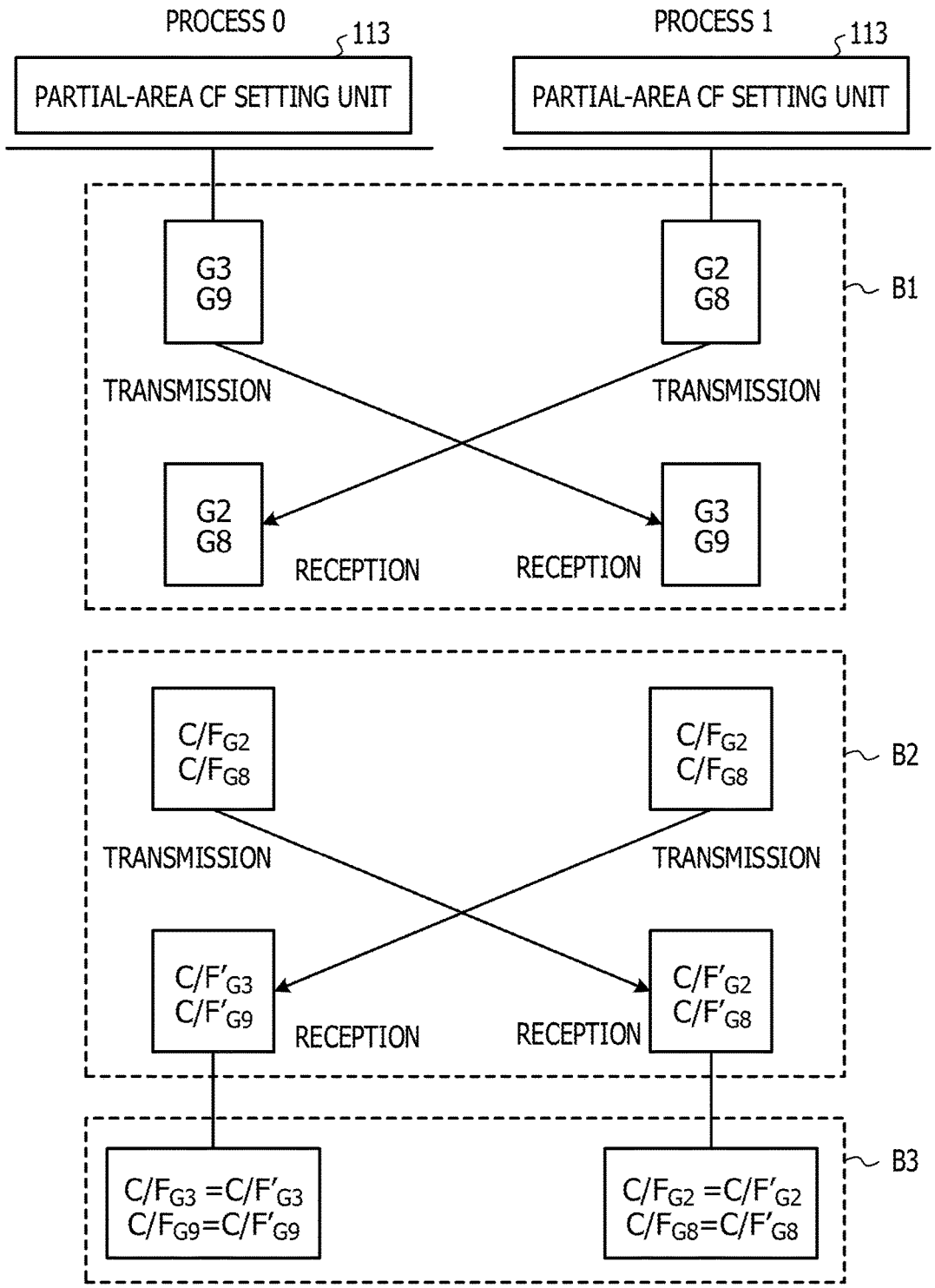
FIG. 21 illustrates an exemplary process of a CF update processor.

FIG. 21 illustrates an exemplary process pattern of the CF update processor. C/F points of the grid points in a wing area are set for the partial area, but may be different from C/F points which are set for the primary responsible area. This is because C/F point setting is performed in any way. When the C/F point settings of the grid points in a wing area are different from C/F point settings of the primary responsible area, a contradiction will arise in the process of generating an interpolation matrix and the process of generating a coefficient matrix of the next hierarchical level, which are performed subsequently, resulting in incorrect generation of an AMG hierarchy. Therefore, the CF update processor 114 performs an update operation so that the C/F point settings of the grid points in a wing area match the settings of the primary responsible area.

The numbers with 'G', such as G3 and G9, in FIG. 21 indicate global numbers. Each process transmits the global numbers of the wing area to the process responsible for the primary responsible area. For example, the process 0 transmits G3 and G9 to the process 1 because G3 and G9 correspond to the wing area. Similarly, the process 1 transmits G2 and G8 to the process 0. Then, the C/F point settings of the points corresponding to the received global numbers are transmitted back to the transmission source. Each process updates the settings of the wing area with the C/F point settings which have been transmitted back.

The CF update processor 114 performs a process (B1) of receiving and transmitting the global numbers of a wing area, a process (B2) of transmitting back the C/F point settings, and a process (B3) of updating CF settings. In the process (B1) of receiving and transmitting the global numbers of a wing area, the CF update processor 114 causes the process for each area to ask, over a network, the process responsible for the primary responsible area about information on C/F points of the grid points in the wing area. In the process (B2) of transmitting back the C/F point settings, the CF update processor 114 causes the process for the primary responsible area to transmit information on C/F points of the received grid point numbers, back to the transmission source. In the process (B3) of updating CF settings, the CF update processor 114 causes the process for each area to update information on C/F points of the grid points in the wing area with the information on C/F points which is received from the process responsible for the primary responsible area.

Figure 22:
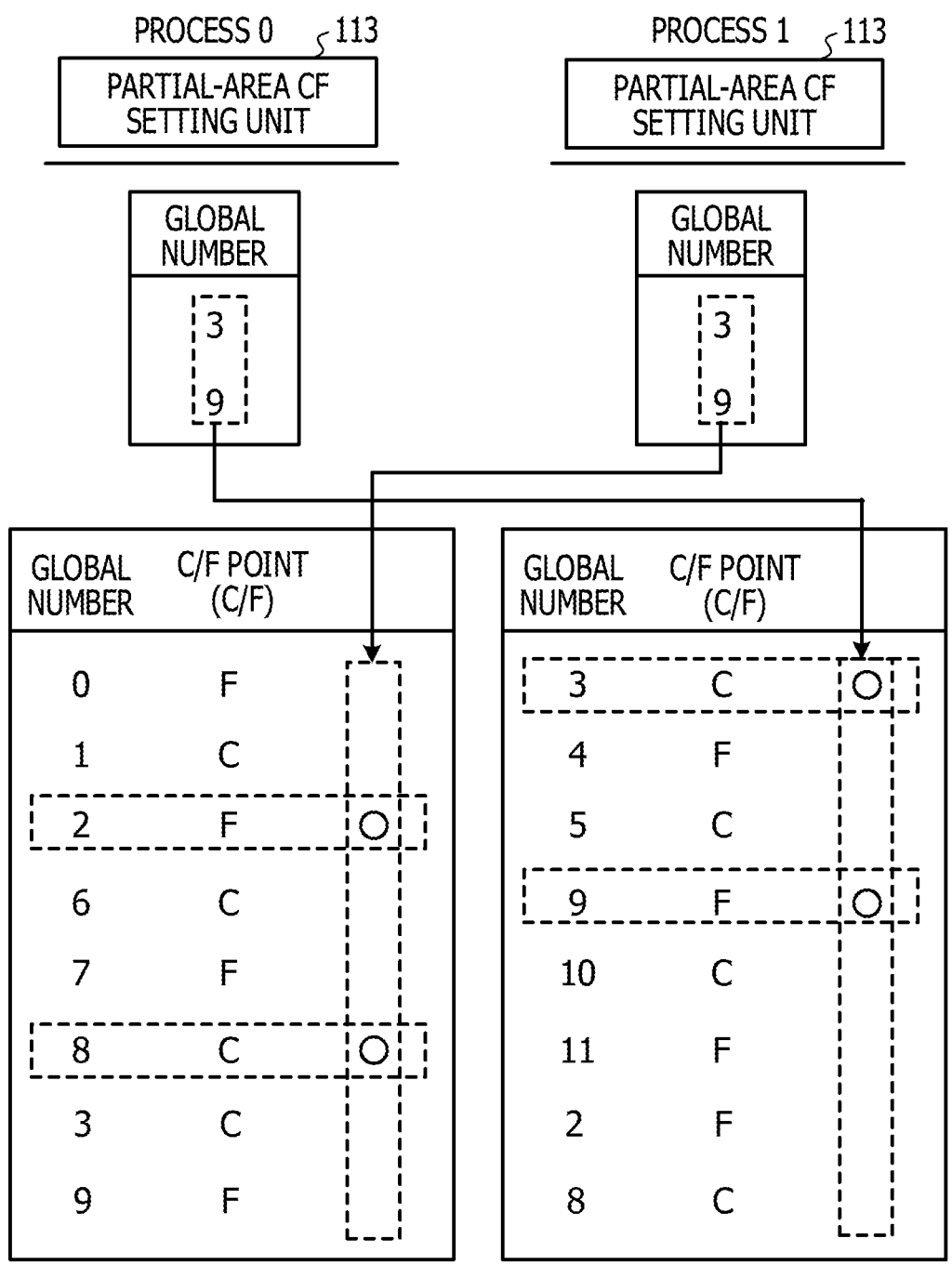
FIG. 22 illustrates an exemplary process (B1) of receiving and transmitting the global numbers of a wing area, which is performed by a CF update processor.

In the process (B1) of receiving and transmitting the global numbers of a wing area, as illustrated in FIG. 22, the global numbers of the wing area are transmitted to the process responsible for the primary responsible area. The process 0 transmits the global numbers 3 and 9 to the process 1. The process 1 transmits the global numbers 2 and 8 to the process 0.

Figure 23:
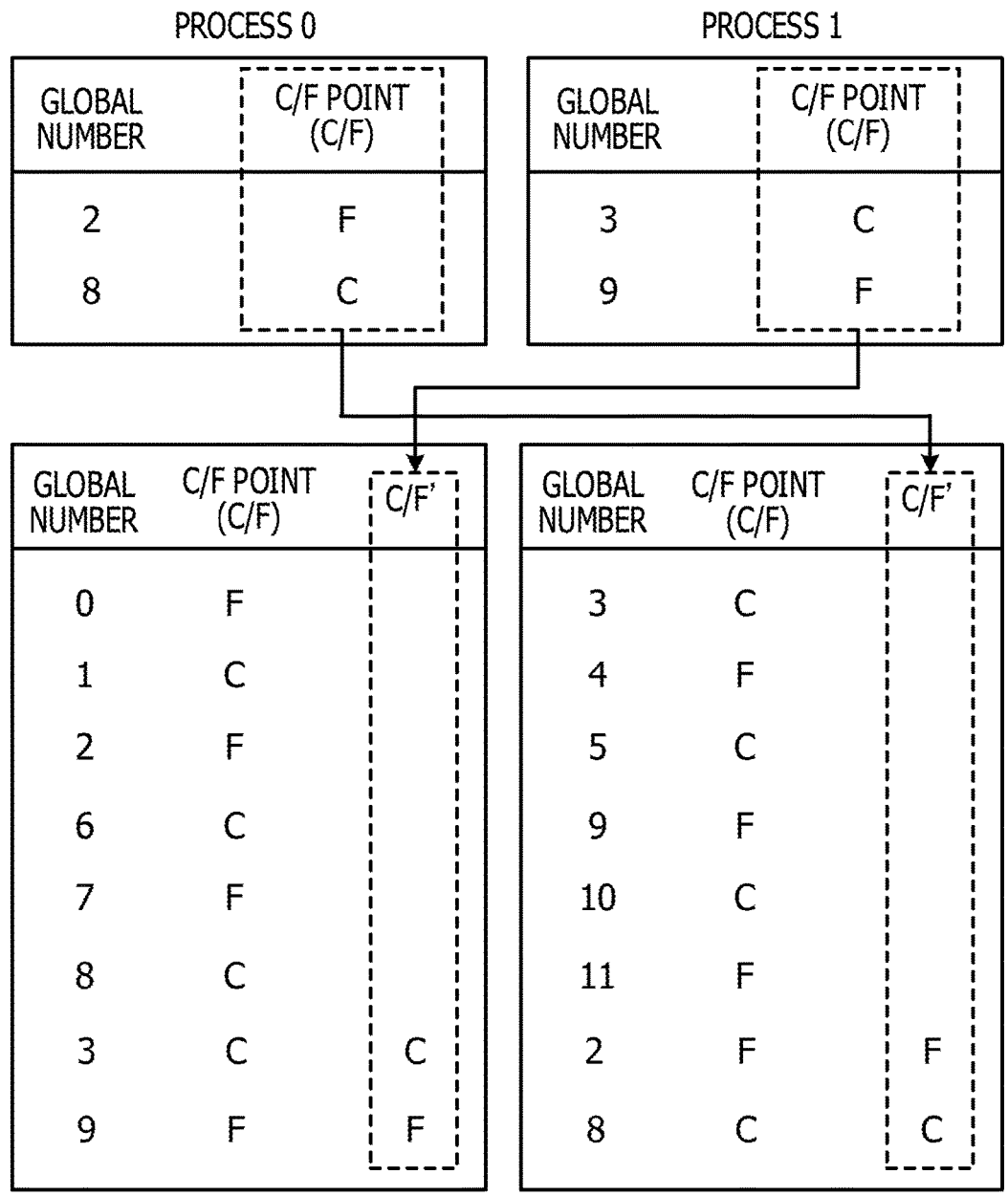
FIG. 23 illustrates an exemplary process (B2) of transmitting C-point/F-point (C/F point) settings back, which is performed by a CF update processor.

In the process (B2) of transmitting back the C/F point settings, as illustrated in FIG. 23, each process stores, in a transmission buffer, the C/F point settings of the requested global numbers, and transmits the settings back to the transmission source. The process 0 transmits the C/F point settings of the global numbers 2 and 8 back to the process 1. The process 1 transmits the C/F point settings of the global numbers 3 and 9 back to the process 0. The C/F point settings which have been transmitted back are stored in a reception buffer C/F'.

In the process (B3) of updating CF settings, as illustrated in FIG. 24, the C/F point setting of each point is replaced with the corresponding data in the buffer C/F'. In the case of FIG. 24, the C/F point settings of the wing area are the same as those of the primary responsible area. However, different settings may be present. When different settings are present, the settings of the primary responsible area are prioritized. Thus, a contradiction does not arise in generation of an interpolation matrix and generation of a coefficient matrix of the next hierarchical level.

As described above, the processes perform the coarse-graining processing in parallel, and the process of setting C points, which are to remain in the next hierarchical level, and F points, which are to be thinned out, ends. In the process of generating an interpolation matrix and the process of generating a coefficient matrix of the next hierarchical level, the technique of the AMG method may be used. For example, without execution of the evaluation-value update processing and the CF update processing, C/F point setting may be performed.

Figure 25:
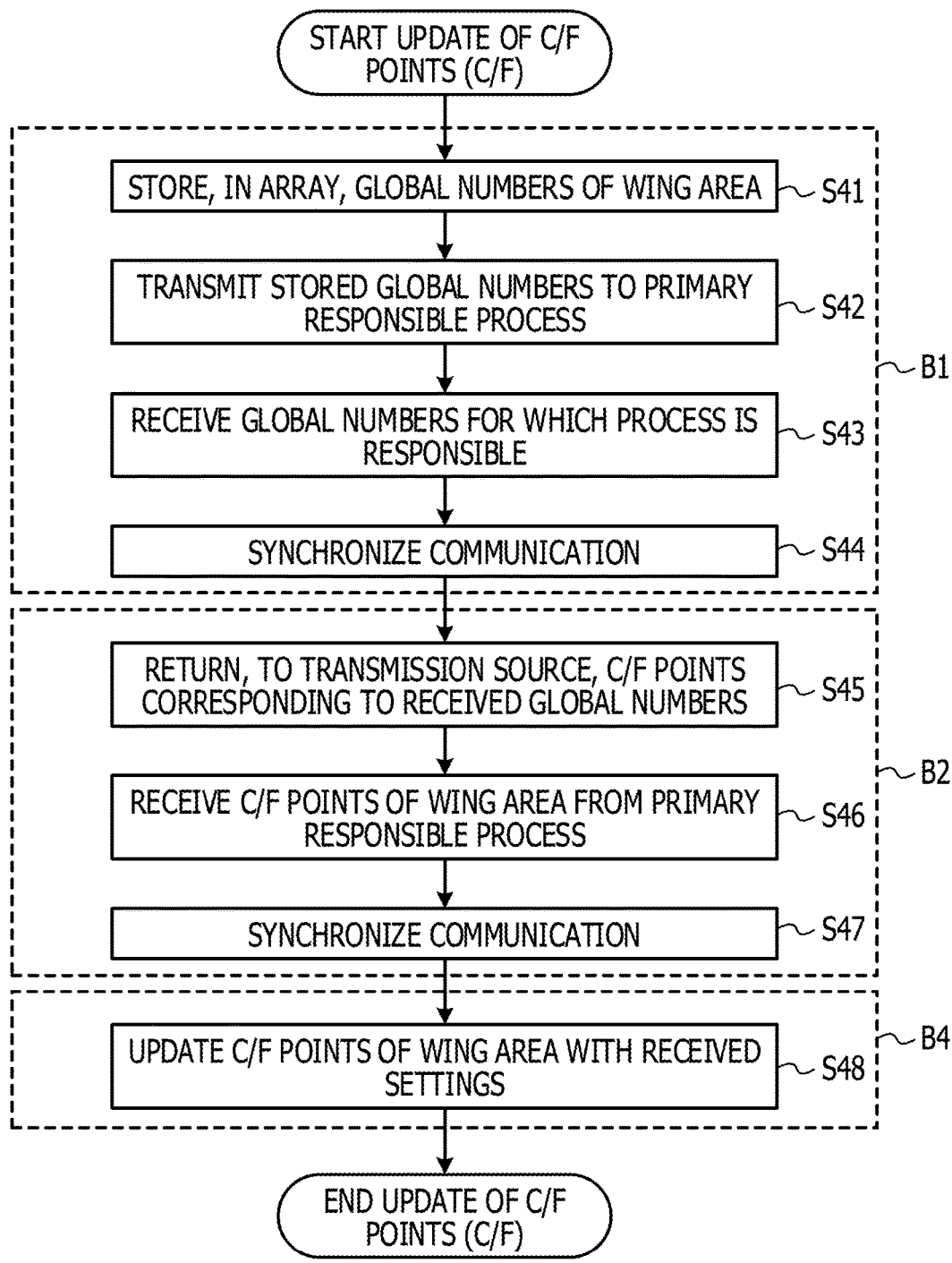
FIG. 25 illustrates an exemplary process of a CF update processor.
Figure 27:
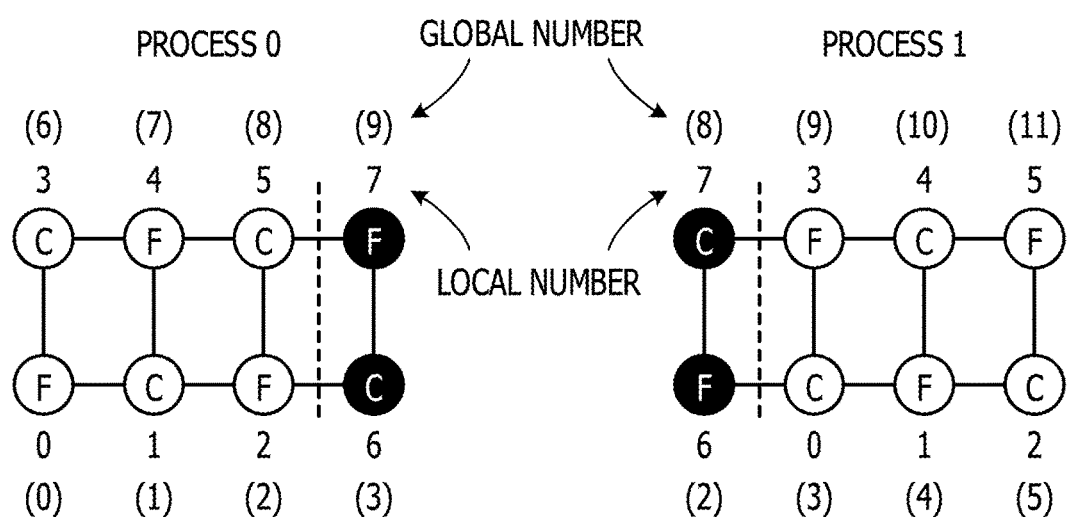
FIG. 27 illustrates exemplary C/F point settings of a wing area.
Figure 28:
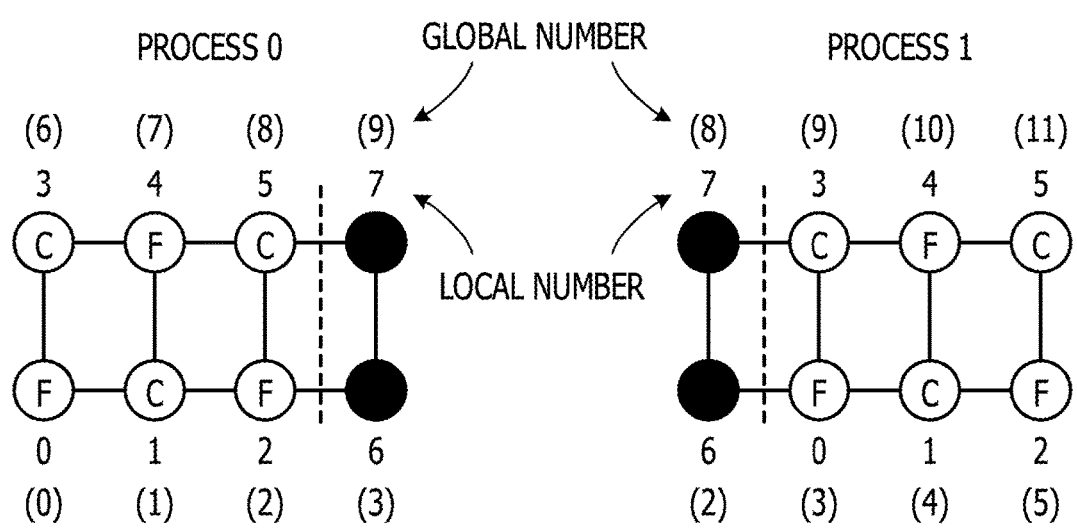
FIG. 28 illustrates exemplary C/F point settings of a wing area.

FIG. 25 illustrates exemplary CF update processing of the CF update processor 114.

In step S41, the CF update processor 114 stores, in an array, the global numbers of a wing area. Then, the process proceeds to S42.

In step S42, the CF update processor 114 transmits the stored global numbers to the primary responsible process. Then, the process proceeds to S43.

In step S43, the CF update processor 114 causes the process to receive the global numbers for which the process is responsible. Then, the process proceeds to S44.

In step S44, the CF update processor 114 synchronizes the communication. Then, the process proceeds to S45.

In step S45, the CF update processor 114 returns, to the transmission source, the C/F points of the points corresponding to the received global numbers. Then, the process proceeds to S46.

In step S46, the CF update processor 114 receives the C/F points of the wing area from the primary responsible process. Then, the process proceeds to S47.

In step S47, the CF update processor 114 synchronizes the communication. Then, the process proceeds to S48.

In step S48, the CF update processor 114 updates the C/F points of the wing area with the received settings. Then, the process ends.

For example, C/F point setting of a wing area may not be performed. There may be the case in which the points of the local numbers 2 and 5 (the global numbers 2 and 8) of the process 0 and the points of the local numbers 0 and 3 (the global numbers 3 and 9) of the process 1 are compulsorily set to C points, for example, the case in which the points in a boundary area are to remain in the next hierarchical level. This case indicates that the connection relationship represented by the coefficient matrix of the entire computational model is ignored. Accordingly, not only does convergence to a solution fail to be guaranteed, but also the number of remaining points (C points) is increased. Therefore, the amount of computation process may be increased, and the number of iterations performed until a solution is obtained may be increased. Consequently, in parallel computing, an increase in the number of computers in parallel may fail to achieve an expected increase in the computational speed. For example, C/F point setting is performed in consideration of the connection between grid points in a wing area. Thus, the number of iterations performed until a solution is obtained is decreased. Therefore, in parallel computing, an increase in the computational speed may be achieved when the number of computers in parallel is increased.

For example, C/F point setting performed in consideration of the connection relationship with grid points in a wing area causes information about the entire computational model to be reflected. Therefore, the computational accuracy of each divided area may be improved. For example, consideration of the connection relationship with grid points in a wing area causes an increase in the size of a matrix that is to be computed, and also causes an increase in the amount of calculation on each divide area. However, C/F point setting performed in consideration of the connection relationship with grid points in a wing area guarantees the convergence to a solution, and achieves a small number of iterations performed until a solution is obtained. Therefore, from a viewpoint of the entire computational model, the amount of calculation is decreased, resulting in an increase in the computational speed. For example, C/F point setting is performed in consideration of the connection relationship with grid points in a wing area. Therefore, there arises no contradiction to the case in which C/F point setting is performed based on the coefficient matrix obtained from the entire computational model. Accordingly, compared with the case in which only information about a partial area is used, even when the number of computers in parallel is increased, the computational accuracy is improved, and the number of iterations is decreased, achieving fast calculation.

The parallel processing apparatus, the parallel computing method, and the parallel computing program which are described above may be preferably used when an electromagnetic field, a fluid motion, or the like is numerically analyzed on a computer by using a finite element method, a finite volume method, or the like.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A parallel processing apparatus comprising:
   a plurality of processors; and
   a network switch that couples the plurality of processors to each other,
   wherein a first processor among the plurality of processors:
   generates divided matrix data, when processing matrix data using a parallel processing based on an algebraic multigrid method and determining a C point or an F point, by dividing the matrix data in such a manner that an overlapping portion is present with each other;
   transmits the divided matrix data to a second processor which is different from the first processor and is included in the plurality of processors;
   generates first evaluation-value matrix data from the divided matrix data;
   transmits, to the second processor, first elements in a first overlapping portion of the first evaluation-value matrix data;
   receives, from the second processor, second elements of a second overlapping portion of second evaluation-value matrix data which is generated by the second processor;
   calculates first added evaluation data by adding the second elements to the first elements;
   transmits the first added evaluation data to the second processor;

receives, from the second processor, second added evaluation data which is calculated by the second processor; and calculates a first C point or a first F point based on the first evaluation-value matrix data which is updated by inputting the second added evaluation data to the first evaluation-value matrix data.

2. The parallel processing apparatus according to claim 1, wherein the first processor:

transmits information on the first C point or the first F point to the second processor; and receives, from the second processor, information on a second C point or a second F point which is calculated by the second processor.

3. The parallel processing apparatus according to claim 2, wherein the first processor:

updates the first C point or the first F point of the first element in the first overlapping portion based on the information on the second C point or the second F point.

4. A parallel computing method comprising:

generating, by a first processor of a plurality of processors which are coupled by a network switch with each other, divided matrix data, when processing matrix data using a parallel processing based on an algebraic multigrid method and determining a C point or an F point, by dividing the matrix data in such a manner that an overlapping portion is present with each other;

transmitting the divided matrix data to a second processor which is different from the first processor and is included in the plurality of processors;

generating first evaluation-value matrix data from the divided matrix data;

transmitting, to the second processor, first elements in a first overlapping portion of the first evaluation-value matrix data;

receiving, from the second processor, second elements of a second overlapping portion of second evaluation-value matrix data which is generated by the second processor;

calculating first added evaluation data by adding the second elements to the first elements;

transmitting the first added evaluation data to the second processor;

receiving, from the second processor, second added evaluation data which is calculated by the second processor; and calculating a first C point or a first F point based on the first evaluation-value matrix data which is updated by inputting the second added evaluation data to the first evaluation-value matrix data.

5. The parallel processing apparatus according to claim 4, further comprising:

transmitting, by the first processor, information on the first C point or the first F point to the second processor; and receiving, from the second processor, information on a second C point or a second F point which is calculated by the second processor.

6. The parallel processing apparatus according to claim 5, further comprising:

updating the first C point or the first F point of the first element in the first overlapping portion based on the information on the second C point or the second F point.

7. A non-transitory computer-readable recording medium storing a parallel computing program which causes a computer to preform a process, the process comprising:

generating divided matrix data, when processing matrix data using a parallel processing based on an algebraic multigrid method and determining a C point or an F point, by dividing the matrix data in such a manner that an overlapping portion is present with each other;

transmitting the divided matrix data from a first processor to a second processor which is different from the first processor and is included in the plurality of processors;

generating first evaluation-value matrix data from the divided matrix data;

transmitting, to the second processor, first elements in a first overlapping portion of the first evaluation-value matrix data;

receiving, from the second processor, second elements of a second overlapping portion of second evaluation-value matrix data which is generated by the second processor;

calculating first added evaluation data by adding the second elements to the first elements;

transmitting the first added evaluation data to the second processor;

receiving, from the second processor, second added evaluation data which is calculated by the second processor; and calculating a first C point or a first F point based on the first evaluation-value matrix data which is updated by inputting the second added evaluation data to the first evaluation-value matrix data.

8. The parallel processing apparatus according to claim 7, further comprising:

transmitting, by the first processor, information on the first C point or the first F point to the second processor; and receiving, from the second processor, information on a second C point or a second F point which is calculated by the second processor.

9. The parallel processing apparatus according to claim 8, further comprising:

updating the first C point or the first F point of the first element in the first overlapping portion based on the information on the second C point or the second F point.

* * * * *